United States Patent
Kanna

(10) Patent No.: US 10,031,631 B2
(45) Date of Patent: Jul. 24, 2018

(54) TRANSFER FILM, METHOD FOR PRODUCING TRANSFER FILM, TRANSPARENT LAMINATE, METHOD FOR PRODUCING TRANSPARENT LAMINATE, CAPACITANCE-TYPE INPUT DEVICE, AND IMAGE DISPLAY DEVICE

(71) Applicant: FUJIFILM Corporation, Tokyo (JP)

(72) Inventor: Shinichi Kanna, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/239,904

(22) Filed: Aug. 18, 2016

(65) Prior Publication Data

US 2016/0357290 A1 Dec. 8, 2016

Related U.S. Application Data

(63) Continuation of application No. PCT/JP2015/054569, filed on Feb. 19, 2015.

(30) Foreign Application Priority Data

Feb. 19, 2014 (JP) .................................. 2014-029789

(51) Int. Cl.
*B32B 7/02* (2006.01)
*G06F 3/044* (2006.01)
(Continued)

(52) U.S. Cl.
CPC ................ *G06F 3/044* (2013.01); *B32B 3/10* (2013.01); *B32B 3/30* (2013.01); *B32B 7/02* (2013.01);
(Continued)

(58) Field of Classification Search
CPC . B32B 7/02; B32B 27/20; B32B 2203/04103; B32B 2264/102;
(Continued)

(56) References Cited

U.S. PATENT DOCUMENTS 8,492,450 B2 7/2013 Araki et al.
8,872,786 B2 10/2014 Matsuo
(Continued)

FOREIGN PATENT DOCUMENTS

JP 11-288225 A 10/1999
JP 2006-048026 A 2/2006
(Continued)

OTHER PUBLICATIONS

International Preliminary on Patentability Report with translation of Written Opinion dated Sep. 1, 2016, issued by the International Searching Authority in Application No. PCT/JP2015/054569.
(Continued)

*Primary Examiner* — Bruce H Hess
(74) *Attorney, Agent, or Firm* — Sughrue Mion, PLLC

(57) ABSTRACT

Provided are a transfer film having a temporary support, a first curable transparent resin layer disposed adjacently to the temporary support to be in direct contact therewith, and a second curable transparent resin layer disposed adjacently to the first curable transparent resin layer to be in direct contact therewith, in this order, in which the refractive index of the second curable transparent resin layer is higher than the refractive index of the first curable transparent resin layer, and the second curable transparent resin layer contains metal oxide particles at a proportion of 28.1% by mass to 95% by mass relative to the total solid content of the second curable transparent resin layer, the transfer film being capable of forming a transparent laminate that is free of the problem that a transparent electrode pattern is visually recognized; a method for producing a transfer film; a method for producing a transparent laminate; a transparent laminate; a capacitance-type input device; and an image display device.

5 Claims, 6 Drawing Sheets

(51) Int. Cl.
*G06F 3/041* (2006.01)
*B32B 27/08* (2006.01)
*B32B 27/20* (2006.01)
*B32B 27/30* (2006.01)
*B32B 27/32* (2006.01)
*B32B 37/00* (2006.01)
*B32B 3/10* (2006.01)
*B32B 3/30* (2006.01)
*C09D 123/06* (2006.01)

(52) U.S. Cl.
CPC .............. *B32B 27/08* (2013.01); *B32B 27/20* (2013.01); *B32B 27/308* (2013.01); *B32B 27/325* (2013.01); *B32B 37/00* (2013.01); *C09D 123/06* (2013.01); *G06F 3/041* (2013.01); *B32B 2264/102* (2013.01); *B32B 2307/202* (2013.01); *B32B 2307/412* (2013.01); *B32B 2307/418* (2013.01); *B32B 2457/00* (2013.01); *B32B 2457/20* (2013.01); *B32B 2457/208* (2013.01); *G06F 2203/04103* (2013.01)

(58) Field of Classification Search
CPC ........ B32B 2307/412; B32B 2457/208; B32B 2307/208; G09F 3/03547; G09F 3/041; G09F 3/0412; G09F 3/044; G06F 3/03547; G06F 3/041; G06F 3/0412; G06F 3/044
USPC ...................................... 428/32.77
See application file for complete search history.

(56) References Cited

U.S. PATENT DOCUMENTS

| | | |
|---|---|---|
| 2009/0244028 A1 | 10/2009 | Matsuo |
| 2011/0230584 A1 | 9/2011 | Araki et al. |
| 2013/0258479 A1 | 10/2013 | Okafuji et al. |
| 2015/0109252 A1 | 4/2015 | Kanna et al. |
| 2015/0116270 A1 | 4/2015 | Kanna et al. |
| 2015/0251393 A1* | 9/2015 | Kanna ..................... G06F 3/044 428/334 |
| 2017/0095999 A1* | 4/2017 | Kaneiwa ............... B32B 37/025 |

FOREIGN PATENT DOCUMENTS

| | | |
|---|---|---|
| JP | 2007-328284 A | 12/2007 |
| JP | 2007-334045 A | 12/2007 |
| JP | 2008-107779 A | 5/2008 |
| JP | 2010-061425 A | 3/2010 |
| JP | 2010-86684 A | 4/2010 |
| JP | 2010-152809 A | 7/2010 |
| JP | 2010-257492 A | 11/2010 |
| JP | 2014-10814 A | 1/2014 |
| WO | 2006/126604 A1 | 11/2006 |
| WO | 2008/041664 A1 | 4/2008 |
| WO | 2010/061744 A1 | 6/2010 |
| WO | 2012/073990 A1 | 6/2012 |
| WO | 2012/086749 A1 | 6/2012 |
| WO | 2014/007050 A1 | 1/2014 |
| WO | 2014/084112 A1 | 6/2014 |

OTHER PUBLICATIONS

Office Action dated Mar. 22, 2017, issued from the State Intellectual Property Office of People's Republic of China in corresponding Chinese Application No. 201580009304.7.
International Search Report for PCT/JP2015/054569 dated May 26, 2015.
Written Opinion for PCT/JP2015/054569 dated May 26, 2015.
Office Action dated May 30, 2017 from the Japanese Patent Office in counterpart Japanese Application No. 2016-504152.
Office Action dated Nov. 28, 2017 from the Japanese Patent Office in counterpart Japanese Application No. 2016-504152.
Communication dated Mar. 14, 2018 from the Taiwanese Intellectual Property Office in counterpart application No. 104105856.

* cited by examiner

TRANSFER FILM, METHOD FOR PRODUCING TRANSFER FILM, TRANSPARENT LAMINATE, METHOD FOR PRODUCING TRANSPARENT LAMINATE, CAPACITANCE-TYPE INPUT DEVICE, AND IMAGE DISPLAY DEVICE

CROSS-REFERENCE TO RELATED APPLICATIONS

This application is a Continuation of PCT International Application No. PCT/JP2015/054569, filed on Feb. 19, 2015, which claims priority under 35 U.S.C. Section 119(a) to Japanese Patent Application No. 2014-029789 filed on Feb. 19, 2014. Each of the above applications is hereby expressly incorporated by reference, in its entirety, into the present application.

BACKGROUND OF THE INVENTION

1. Field of the Invention

The present invention relates to a transfer film, a method for producing a transfer film, a transparent laminate, a method for producing a transparent laminate, a capacitance-type input device, and an image display device. More particularly, the invention relates to a capacitance-type input device that is capable of detecting the position of contact of a finger as a change in the capacitance, a transparent laminate that can be used for the capacitance-type input device, a transfer film that is used to produce a transparent laminate, a method for producing a transfer film, a method for producing a transparent laminate using this transfer film, and an image display device comprising this capacitance-type input device as a constituent element.

2. Description of the Related Art

In recent years, in regard to electronic equipment such as mobile telephones, car navigation systems, personal computers, ticket-vending machines, and automatic teller machines, a tablet-type input device is disposed on the surface of a liquid crystal device or the like, so that when a finger, a touch pen or the like touches the site of an instruction image displayed on an image display region of the liquid crystal device while this indication image is referred to, input of the information coping with the instruction image can be achieved.

Examples of such an input device (touch panel) include resistive film-type devices and capacitance-type devices. However, since a resistive film-type input device has a two-ply structure composed of a film and a glass plate, in which a short circuit is caused by pressing down the film, such a resistive film-type input device has a defect that the operation temperature range thereof is narrow, and the device is not quite resistant to changes over time.

In contrast, a capacitance-type input device is advantageous in that simply a light-transmitting conductive film may be formed on a single sheet of substrate. In regard to such a capacitance-type input device, for example, there is available an input device of a type in which electrode patterns are extended in directions that intersect each other, so that when a finger or the like touches the device, any change in capacitance between the electrodes is sensed, and the position of input is detected (see, for example, JP2010-86684A, JP2010-152809A, and JP2010-257492A).

In a case of using such a capacitance-type input device, for example, there has been a problem of visibility, such as that a transparent electrode pattern is visually recognized at a position slightly away from the vicinity of a position where regular reflection occurs when the device is lighted by a light source, and the appearance becomes poor. In this regard, JP2010-86684A describes that when an ITO (Indium Tin Oxide) pattern is formed on a substrate, and a layer formed from a low-refractive index dielectric material such as $SiO_2$ and a layer formed from a high-refractive index dielectric material such as $Nb_2O_5$ are alternately laminated only on the upper side of the ITO pattern, the transparent electrode pattern becomes stealthy due to the optical interference effect provided by those various layers, and neutral color tones are obtained.

JP2010-152809A describes that if, before an ITO pattern is formed on a substrate, a low-refractive index layer of $SiO_2$ or the like and a high-refractive index layer of $Nb_2O_5$ or the like are laminated only on the lower side of the ITO pattern, and then the ITO pattern is formed, the shape of the transparent electrode pattern can be prevented from appearing.

JP2010-257492A describes that if, before an ITO pattern is formed on a substrate, a low-refractive index layer of $SiO_2$ or the like and a high-refractive index layer of $Nb_2O_5$ or the like are laminated only on the lower side of the ITO pattern, and then the ITO pattern is formed, the transparent electrode pattern or the intersections between patterns can be made unnoticeable.

Regarding the method for forming a transparent film such as a transparent insulating layer or a transparent protective film as described in these patent documents, various methods are known. Here, among smartphones or tablet computers comprising a capacitance-type touch panel on a liquid crystal display or an organic EL display, devices that use reinforced glass, which is represented by GORILLA GLASS of Corning, Inc., for the front face plate (surface that is brought into direct contact with the finger) have been developed and publicized. Also, devices in which an opening for installing a pressure-sensitive (mechanical mechanism not based on capacitance change but based on pressing force) switch is formed in a portion of the front face plate, have been marketed. Since such reinforced glass has high strength and is not easily processable, in order to form an opening, it is common to form an opening before a reinforcement treatment, and then to perform the reinforcement treatment.

In WO 2010-061744A and JP2010-061425A, as a method for forming a transparent insulating layer or a transparent protective film, in a case in which an organic material is used, only methods of performing coating are described. However, when it is attempted to form a transparent insulating layer or a transparent protective film using the materials described in JP2010-257492A or WO 2010-061744A according to the coating method described in WO 2010-061744A or JP2010-061425A on a reinforcement-treated substrate having an opening as described above, leakage or extrusion of resist components through the opening occurs, and a process for removing the extruded portion is needed. Thus, there is a problem that the production efficiency is markedly decreased.

On the other hand, JP2007-334045A and JP2008-107779A describe transfer materials for color filters, and it has been suggested to laminate such a transfer material on a substrate. In these documents, however, even though utilization of the transfer materials in liquid crystal display devices is mentioned, improvement of the ITO pattern visibility has not been investigated, and nothing is described on the application of the transfer materials in capacitance-type input devices.

In recent years, in order to solve the problem that transparent electrode patterns are visually recognized, a method of using a transparent laminate having a configuration in which a first transparent film, a transparent electrode pattern, a second transparent film, and a transparent protective film are laminated in this order, and the respective refractive indices of the layers are controlled to particular ranges, for capacitance-type input devices is known (see JP2014-10814A). In JP2014-10814A, the second transparent film and the transparent protective film are transferred in sequence using respectively different transfer films.

SUMMARY OF THE INVENTION

In this regard, the inventors of the invention conducted an investigation on the layer configurations described in JP2010-86684A, JP2010-152809A, and JP2010-257492A, and transparent electrode patterns are visually recognized. Thus, it was found that the problem that the transparent electrode patterns are visually recognized is still not completely solved.

Thus, an object of the invention is to provide a transfer film which can form a transparent laminate that does not have the problem that a transparent electrode pattern is visually recognized.

The inventors of the invention found that by using a transfer film having a temporary support; and a first curable transparent resin layer containing metal oxide particles at a particular composition and a second curable transparent resin layer containing metal oxide particles at a particular composition, or a low-refractive index first curable transparent resin layer and a high-refractive index second curable transparent resin layer containing metal oxide particles at a particular composition, such that the respective members are adjacently disposed so as to be in direct contact, the problem that a transparent electrode pattern is visually recognized in a transparent laminate having a configuration in which the second curable transparent resin layer and the first curable transparent resin layer have been transferred onto a transparent electrode pattern, can be solved.

The invention, which is specific means for solving the problems described above, is as follows.

<1> A transfer film comprising: a temporary support; a first curable transparent resin layer disposed adjacently to the temporary support to be in direct contact therewith; and a second curable transparent resin layer disposed adjacently to the first curable transparent resin layer to be in direct contact therewith, in this order, in which the refractive index of the second curable transparent resin layer is higher than the refractive index of the first curable transparent resin layer, and the second curable transparent resin layer contains metal oxide particles at a proportion of 28.1% by mass to 95% by mass relative to the total solid content of the second curable transparent resin layer.

<2> A transfer film comprising:
a temporary support;
a first curable transparent resin layer disposed adjacently to the temporary support to be in direct contact therewith; and
a second curable transparent resin layer disposed adjacently to the first curable transparent resin layer to be in direct contact therewith, in this order,
in which the first curable transparent resin layer contains metal oxide particles at a proportion of 0% by mass to 10% by mass relative to the total solid content of the first curable transparent resin layer, and the second curable transparent resin layer contains metal oxide particles at a proportion of 28.1% by mass to 95% by mass relative to the total solid content of the second curable transparent resin layer.

<3> It is preferable for the transfer film according to <1> or <2> that the first curable transparent resin layer has a refractive index of 1.5 to 1.53.

<4> It is preferable for the transfer film according to any one of <1> to <3> that the second curable transparent resin layer has a refractive index of 1.6 or higher.

<5> It is preferable for the transfer film according to any one of <1> to <4> that the second curable transparent resin layer has a refractive index of 1.65 or higher.

<6> It is preferable for the transfer film according to any one of <1> to <5> that the second curable transparent resin layer has a film thickness of 500 nm or less.

<7> It is preferable for the transfer film according to any one of <1> to <6> that the second curable transparent resin layer has a film thickness of 110 nm or less.

<8> It is preferable for the transfer film according to any one of <1> to <7> that the first curable transparent resin layer has a film thickness of 1 µm or more.

<9> It is preferable for the transfer film according to any one of <1> to <8> that the first curable transparent resin layer includes a polymerizable compound and a photopolymerization initiator.

<10> It is preferable for the transfer film according to any one of <1> to <9> that the double bond consumption rate of the first curable transparent resin layer is 10% or higher.

<11> It is preferable for the transfer film according to any one of <1> to <10> that the second curable transparent resin layer contains metal oxide particles having a refractive index of 1.55 or higher as the metal oxide particles.

<12> It is preferable for the transfer film according to any one of <1> to <11> that the metal oxide particles have a refractive index of 1.9 or higher.

<13> It is preferable for the transfer film according to any one of <1> to <12> that the metal oxide particles are formed from any one kind or two or more kinds selected from titanium oxide, titanium composite oxide, zinc oxide, zirconium oxide, indium/tin oxide, and antimony/tin oxide.

<14> It is preferable for the transfer film according to any one of <1> to <13> that the metal oxide particles are formed from zirconium oxide, and the second curable transparent resin layer contains metal oxide particles at a proportion of 40% by mass to 95% by mass relative to the total solid content of the second curable transparent resin layer.

<15> It is preferable for the transfer film according to any one of <1> to <13> that the metal oxide particles are formed from titanium oxide, and the second curable transparent resin layer contains the metal oxide particles at a proportion of 30% by mass to 70% by mass relative to the total solid content of the second curable transparent resin layer.

<16> It is preferable for the transfer film according to any one of <1> to <15> that the second curable transparent resin layer includes a polymerizable compound.

<17> It is preferable for the transfer film according to any one of <1> to <16> that the first curable transparent resin layer and the second curable transparent resin layer are both thermosetting resin layers.

<18> It is preferable for the transfer film according to any one of <1> to <17> that the first curable transparent resin layer and the second curable transparent resin layer contain acrylic resins.

<19> A method for producing a transfer film, the method comprising: (b) forming, on a temporary support, a first curable transparent resin layer including a polymerizable compound and a photopolymerization initiator such that the temporary support and the first curable transparent resin layer are brought into directly contact with each other; (c) curing the first curable transparent resin layer by exposure to light; and (d) forming a second thermosetting transparent resin layer directly on the first curable transparent resin layer after curing, in which the refractive index of the second curable transparent resin layer is higher than the refractive index of the first curable transparent resin layer, and the second curable transparent resin layer contains metal oxide particles at a proportion of 28.1% by mass to 95% by mass relative to the total solid content of the second curable transparent resin layer.

<20> A method for producing a transfer film, the method comprising: (b) forming, on a temporary support, a first curable transparent resin layer including a polymerizable compound and a photopolymerization initiator such that the temporary support and the first curable transparent resin layer are brought into direct contact with each other; (c) curing the first curable transparent resin layer by exposure to light; and (d) forming a second thermosetting transparent resin layer directly on the first curable transparent resin layer after curing, in which the first curable transparent resin layer contains metal oxide particles at a proportion of 0% by mass to 10% by mass relative to the total solid content of the first curable transparent resin layer, and the second curable transparent resin layer contains metal oxide particles at a proportion of 28.1% by mass of 95% by mass relative to the total solid content of the second curable transparent resin layer.

<21> A method for producing a transparent laminate, the method comprising laminating, on a transparent electrode pattern, the second curable transparent resin layer and the first curable transparent resin layer of the transfer film according to any one of <1> to <18> in this order.

<22> It is preferable for the method for producing a transparent laminate according to <21> that the method further comprises removing the temporary support.

<23> It is preferable for the method for producing a transparent laminate according to <21> or <22> that the transparent electrode pattern is a transparent electrode pattern formed on a transparent film substrate.

<24> A transparent laminate produced by the method for producing a transparent laminate according to any one of <21> to <23>.

<25> A transparent laminate comprising: a transparent electrode pattern; a second curable transparent resin layer disposed adjacently to the transparent electrode pattern; and a first curable transparent resin layer disposed adjacently to the second curable transparent resin layer, in which the refractive index of the second curable transparent resin layer is higher than the refractive index of the first curable transparent resin layer, and the second curable transparent resin layer contains metal oxide particles at a proportion of 28.1% by mass to 95% by mass relative to the total solid content of the second curable transparent resin layer.

<26> A transparent laminate comprising: a transparent electrode pattern; a second curable transparent resin layer disposed adjacently to the transparent electrode pattern; and a first curable transparent resin layer disposed adjacently to the second curable transparent resin layer, in which the first curable transparent resin layer contains metal oxide particles at a proportion of 0% by mass to 10% by mass relative to the total solid content of the first curable transparent resin layer, and the second curable transparent resin layer contains metal oxide particles at a proportion of 28.1% by mass to 95% by mass relative to the total solid content of the second curable transparent resin layer.

<27> It is preferable for the transparent laminate according to <25> or <26> that the transparent electrode pattern is a transparent electrode pattern formed on a transparent film substrate.

<28> It is preferable for the transparent laminate according to <27> that the transparent laminate comprises a transparent electrode pattern, a second curable transparent resin layer, and a first curable transparent resin layer, respectively on both surfaces of the transparent film substrate.

<29> It is preferable for the transparent laminate according to any one of <25> to <28> that the transparent laminate further comprises a transparent film containing a metal oxide and having a film thickness of 55 nm to 110 nm, or a transparent film having a refractive index of 1.6 to 1.80 and having a film thickness of 55 nm to 110 nm, on the opposite side of the side of the transparent electrode pattern where the second curable transparent resin layer is formed.

<30> It is preferable for the transparent laminate according to <29> that the transparent film is disposed between the transparent electrode pattern and the transparent film substrate.

<31> It is preferable for the transparent laminate according to any one of <25> to <30> that the double bond consumption rate of the first curable transparent resin layer is 10% or higher.

<32> A capacitance-type input device, being produced using the transfer film according to any one of <1> to <18>, or comprising the transparent laminate according to any one of <24> to <31>.

<33> An image display device comprising the capacitance-type input device according to <32> as a constituent element.

Furthermore, the following configurations are also preferable embodiments of the invention.

[1] A transfer film having a temporary support; a first curable transparent resin layer disposed adjacently to the temporary support to be in direct contact therewith; and a second curable transparent resin layer disposed adjacently to the first curable transparent resin layer to be in direct contact therewith, in this order, in which the refractive index of the second curable transparent resin layer is higher than the refractive index of the first curable transparent resin layer, and the refractive index of the second curable transparent resin layer is 1.6 or higher.

[2] It is preferable for the transfer film according to [1] that the first curable transparent resin layer has a refractive index of 1.5 to 1.53.

[3] It is preferable for the transfer film according to [1] or [2] that the second curable transparent resin layer has a refractive index of 1.65 or higher.

[4] It is preferable for the transfer film according to any one of [1] to [3] that the second curable transparent resin layer has a film thickness of 500 nm or less.

[5] It is preferable for the transfer film according to any one of [1] to [4] that the second curable transparent resin layer has a film thickness of 110 nm or less.

[6] It is preferable for the transfer film according to any one of [1] to [5] that the first curable transparent resin layer has a film thickness of 1 µm or more.

[7] It is preferable for the transfer film according to any one of [1] to [6] that the first curable transparent resin layer includes a polymerizable compound and a photopolymerization initiator.

[8] It is preferable for the transfer film according to any one of [1] to [7] that the double bond consumption rate of the first curable transparent resin layer is 10% or higher.

[9] It is preferable for the transfer film according to any one of [1] to [8] that the second curable transparent resin layer contains fine particles having a refractive index of 1.55 or higher.

[10] It is preferable for the transfer film according to any one of [1] to [9] that the second curable transparent resin layer includes a polymerizable compound.

[11] It is preferable for the transfer film according to any one of [1] to [10] that the first curable transparent resin layer and the second curable transparent resin layer are both thermosetting resin layers.

[12] A method for producing a transfer film, the method having (b) forming, on a temporary support, a first curable transparent resin layer including a polymerizable compound and a photopolymerization initiator such that the temporary support and the first curable transparent resin layer are brought into direct contact with each other; (c) curing the first curable transparent resin layer by exposure to light; and (d) forming a second thermosetting transparent resin layer directly on the first curable transparent resin layer after curing, in which the refractive index of the second curable transparent resin layer is higher than the refractive index of the first curable transparent resin layer, and the refractive index of the second curable transparent resin layer is 1.55 or higher.

[13] A method for producing a transparent laminate, the method including laminating, on a transparent electrode pattern, the second curable transparent resin layer and the first curable transparent resin layer of the transfer film according to any one of [1] to [12] in this order.

[14] It is preferable for the method for producing a transparent laminate according to [13] that the method further includes removing the temporary support.

[15] It is preferable for the method for producing a transparent laminate according to [13] or [14] that the transparent electrode pattern is a transparent electrode pattern formed on a transparent film substrate.

[16] A transparent laminate produced by the method for producing a transparent laminate according to any one of [13] to [15].

[17] A transparent laminate having a transparent electrode pattern; a second curable transparent resin layer disposed adjacently to the transparent electrode pattern; and a first curable transparent resin layer disposed adjacently to the second curable transparent resin layer, in which the refractive index of the second curable transparent resin layer is higher than the refractive index of the first curable transparent resin layer, and the refractive index of the second curable transparent resin layer is 1.6 or higher.

[18] It is preferable for the transparent laminate according to [17] that the transparent electrode pattern is a transparent electrode pattern formed on a transparent film substrate.

[19] It is preferable for the transparent laminate according to [18] that the transparent laminate has a transparent electrode pattern, a second curable transparent resin layer, and a first curable transparent resin layer, respectively on both surfaces of the transparent film substrate.

[20] It is preferable for the transparent laminate according to any one of [17] to [19] that the transparent laminate further has a transparent film having a refractive index of 1.6 to 1.78 and a film thickness of 55 nm to 110 nm on the opposite side of the side of the transparent electrode pattern where the second curable transparent resin layer is formed.

[21] It is preferable for the transparent laminate according to [20] that the transparent film is disposed between the transparent electrode pattern and the transparent film substrate.

[22] The transparent laminate according to any one of [17] to [21] that the double bond consumption rate of the first curable transparent resin layer is 10% or higher.

[23] A capacitance-type input device, being produced using the transfer film according to any one of [1] to [11], or including the transparent laminate according to any one of [16] to [22].

[24] An image display device comprising the capacitance-type input device according to [23] as a constituent element.

According to the invention, a transfer film which is capable of forming a transparent laminate and is free of the problem that a transparent electrode pattern is visually recognized, can be provided.

DESCRIPTION OF THE PREFERRED EMBODIMENTS

Figure 1A:
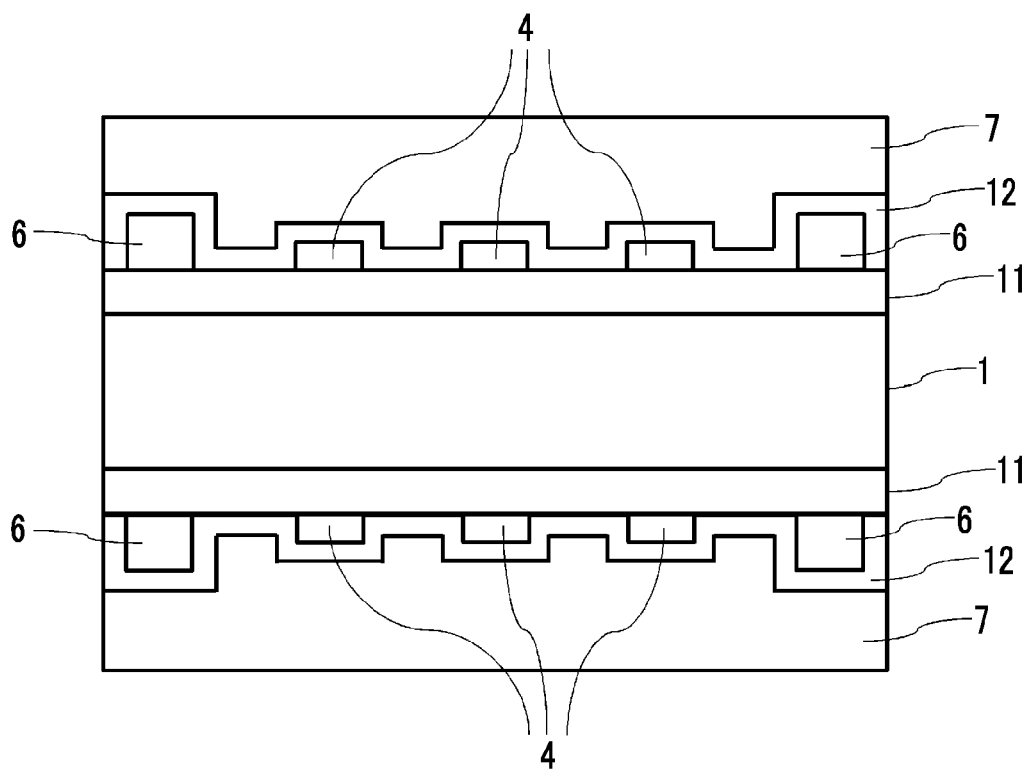
FIG. 1A is a schematic cross-sectional view illustrating an example of the configuration of the capacitance-type input device of the invention.

Hereinafter, the transfer film, method for producing a transfer film, a transparent laminate, a method for producing a transparent laminate, a capacitance-type input device, and an image display device of the invention will be explained. The explanation of the constituent elements described below may be based on representative embodiments or specific examples of the invention; however, the invention is not intended to be limited to such embodiments or specific examples. Furthermore, in the present specification, a range of numerical values represented by using "to" means a range which includes numerical values listed before and after "to" as the lower limit and upper limit respectively.

According to the present specification, unless particularly stated otherwise, the refractive index of each layer means the refractive index at a wavelength of 550 nm.

[Transfer Film]

A transfer film according to a first embodiment of the invention comprises: a temporary support; a first curable transparent resin layer disposed adjacently to the temporary support to be in direct contact therewith; and a second curable transparent resin layer disposed adjacently to the first curable transparent resin layer to be in direct contact therewith, in this order, in which the refractive index of the second curable transparent resin layer is higher than the refractive index of the first curable transparent resin layer, and the second curable transparent resin layer contains metal oxide particles at a proportion of 28.1% by mass to 95% by mass relative to the total solid content of the second curable transparent resin layer.

A transfer film according to a second embodiment of the invention comprises: a temporary support; a first curable transparent resin layer disposed adjacently to the temporary support to be in direct contact therewith; and a second curable transparent resin layer disposed adjacently to the first curable transparent resin layer to be in direct contact therewith, in this order, in which the first curable transparent resin layer contains metal oxide particles at a proportion of 0% by mass to 10% by mass relative to the total solid content of the first curable transparent resin layer, and the second curable transparent resin layer contains metal oxide particles at a proportion of 28.1% by mass to 95% by mass relative to the total solid content of the second curable transparent resin layer.

When such configurations are adopted, transparent laminates that are free of the problem that transparent electrode patterns are visually recognized can be formed. It is not intended to be restricted by any theory; however, when the difference between the refractive indices of a transparent electrode pattern (preferably ITO) and the second curable transparent resin layer, and the difference between the refractive indices of the second curable transparent resin layer and the first curable transparent resin layer are made small, light reflection is reduced, and a transparent electrode pattern becomes not easily noticeable. Thus, visibility can be improved. Particularly, in the second embodiment of the transfer film of the invention, it is intended to make the refractive index of the second curable transparent resin layer higher than the refractive index of the first curable transparent resin layer by allowing the first curable transparent resin layer to contain metal oxide particles at a proportion of 0% by mass to 10% by mass relative to the total solid content of the first curable transparent resin layer, and the second curable transparent resin layer to contain metal oxide particles at a proportion of 28.1% by mass to 95% by mass relative to the total solid content of the second curable transparent resin layer. It is understandable for those ordinarily skilled in the art that the refractive index of the second curable transparent resin layer containing 28.1% by mass to 95% by mass of metal oxide particles is higher than the refractive index of the first curable transparent resin layer containing 0% by mass to 10% by mass of metal oxide particles. Therefore, a person having ordinary skill in the art can understand the significance of value (criticality) of the factor that the first curable transparent resin layer contains metal oxide particles at a proportion of 10% by mass or less relative to the total solid content of the first curable transparent resin layer. Meanwhile, the embodiment of the second curable transparent resin layer containing metal oxide particles at a proportion of 28.1% by mass is described in Example 1 given below.

In the following, preferred embodiments of the transfer film of the invention will be explained. Meanwhile, the transfer film of the invention is preferably intended for a transparent insulating layer or a transparent protective layer for a capacitance-type input device.

<Temporary Support>

The transfer film of the invention has a temporary support.

Regarding the temporary support, a material which has flexibility and does not undergo noticeable deformation, contraction or elongation under pressure or under pressure and heating, can be used. Examples of such a support include a polyethylene terephthalate film, a cellulose triacetate film, a polystyrene film, and a polycarbonate film, and among them, a biaxially stretched polyethylene terephthalate film is particularly preferred.

The thickness of the temporary support is not particularly limited. The thickness is generally in the range of 5 μm to 200 μm, and from the viewpoints of easy handleability, general-purpose usability, and the like, the thickness is particularly preferably in the range of 10 μm to 150 μm.

Furthermore, the temporary support may be transparent, and may also contain dyed silicon, an alumina sol, a chromium salt, a zirconium salt, or the like.

Furthermore, conductivity can be imparted to the temporary support by the method described in JP2005-221726A, or the like.

<First Curable Transparent Resin Layer and Second Curable Transparent Resin Layer>

The first embodiment of the transfer film of the invention has a first curable transparent resin layer disposed adjacently to a temporary support to be in direct contact therewith, and a second curable transparent resin layer disposed adjacently to the first curable transparent resin layer to be in direct contact therewith, and the refractive index of the second curable transparent resin layer is higher than the refractive index of the first curable transparent resin layer, while the refractive index of the second curable transparent resin layer is 1.6 or higher.

The second embodiment of the transfer film of the invention has a first curable transparent resin layer disposed adjacently to a temporary support to be in direct contact therewith, and a second curable transparent resin layer disposed adjacently to the first curable transparent resin layer to be in direct contact therewith, in this order, and the first curable transparent resin layer contains metal oxide particles at a proportion of 0% by mass to 10% by mass relative to the total solid content of the first curable transparent resin layer, while the second curable transparent resin layer contains metal oxide particles at a proportion of 28.1% by mass to 95% by mass relative to the total solid content of the second curable transparent resin layer.

The first curable transparent resin layer and the second curable transparent resin layer may be thermosetting, may be photocurable, or may be thermosetting and photocurable. Among them, it is preferable that the first curable transparent resin layer and the second curable transparent resin layer are at least thermosetting transparent resin layer, from the viewpoint that reliability can be imparted to the films as the resin layers are thermally cured after transfer. It is more preferable that the first curable transparent resin layer and the second curable transparent resin layer are thermosetting transparent resin layers and photocurable transparent resin layers, from the viewpoint that film can be easily produced by photocuring after transfer, and reliability can be imparted to the films as the resin layers are thermally cured after film production.

Meanwhile, in the present specification, for the convenience of explanation, in a case in which the first curable transparent resin layer and the second curable transparent resin layer of the transfer film of the invention are transferred onto a transparent electrode pattern, and these layers have lost photocurability after being photocured, these layers are continually referred to as the first curable transparent resin layer and the second curable transparent resin layer, respectively, irrespective of whether these layers have thermosetting properties. Furthermore, there are cases in which thermal curing is carried out after these layers are photocured; however, in that case, too, these layers are continually referred to as the first curable transparent resin layer and the second curable transparent resin layer, respectively, irrespective of whether these layers have thermosetting properties.

(Materials of First Curable Transparent Resin Layer and Second Curable Transparent Resin Layer)

The materials of the first curable transparent resin layer and the second curable transparent resin layer are not particularly limited, as long as the refractive index thereof satisfies the aforementioned range of a refractive index.

The transfer film of the invention may be a negative type material, or may be a positive type material.

In a case in which the transfer film of the invention is a negative type material, it is preferable that the first curable transparent resin layer and the second curable transparent resin layer respectively include metal oxide particles, a resin (preferably, an alkali-soluble resin), a polymerizable compound, and a polymerization initiator or a polymerization initiator system. Furthermore, additives and the like are used; however, the invention is not intended to be limited to these.

In regard to the transfer film of the invention, the first curable transparent resin layer and the second curable transparent resin layer may be transparent resin films, or may be inorganic films.

Regarding the inorganic film, the inorganic films used in JP2010-86684A, JP2010-152809A, JP2010-257492A, and the like can be used, and it is preferable to use an inorganic film having a laminated structure of a low-refractive index material and a high-refractive index material, or an inorganic film of a mixed film of a low-refractive index material and a high-refractive index material, all of which are described in those documents, from the viewpoint of controlling the refractive index. Regarding the low-refractive index material and the high-refractive index material, those materials used in JP2010-86684A, JP2010-152809A, and JP2010-257492A can be preferably used, and the disclosures of these documents are incorporated in the present specification.

The inorganic film may be a mixed film of $SiO_2$ and $Nb_2O_5$, and in that case, it is more preferable that the inorganic film is a mixed film of $SiO_2$ and $Nb_2O_5$ formed by sputtering.

According to the invention, the first curable transparent resin layer and the second curable transparent resin layer are preferably resin films, and more preferably transparent resin films.

The method of controlling the refractive index of a transparent resin film is not particularly limited; however, a transparent resin film having a desired refractive index can be used singly, or a transparent resin film to which metal oxide particles or fine particles such as fine metal particles or fine metal oxide particles have been added can be used.

It is preferable that the resin composition used for the transparent resin film contains metal oxide particles for the purpose of regulating the refractive index or light transmitting properties. Since metal oxide particles have high transparency and light transmitting properties, a positive type photosensitive resin composition having a high refractive index and excellent transparency can be obtained.

It is preferable that the metal oxide particles have a higher refractive index than the refractive index of the resin composition formed from materials excluding those particles, and specifically, particles whose refractive index for light having a wavelength of 400 nm to 750 nm is 1.50 or higher are more preferred. Particles having a refractive index of 1.55 or higher are particularly preferred, particles having a refractive index of 1.70 or higher are more particularly preferred, particles having a refractive index of 1.90 or higher are even more particularly preferred, and particles having a refractive index of 2.00 or higher are most preferred.

Here, the refractive index for light having a wavelength of 400 nm to 750 nm being 1.50 or higher implies that the average refractive index for light having a wavelength in the range described above is 1.50 or higher, and it is not necessary for the refractive index for all the lights having wavelengths in the range described above to be 1.50 or higher. Furthermore, the average refractive index is a value obtained by dividing the sum of measured values of the refractive index with respect to each light having a wavelength within the above range by the number of measurement points.

The metal of the metal oxide particles also includes semimetals such as B, Si, Ge, As, Sb, and Te.

Regarding the metal oxide particles having light transmitting properties and a high refractive index, oxide particles including atoms of Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi, Te, and the like are preferred. Titanium oxide, titanium composite oxide, zinc oxide, zirconium oxide, indium/tin oxide, and antimony/tin oxide are more preferred; titanium oxide, titanium composite oxide, and zirconium oxide are even more preferred; and titanium oxide and zirconium oxide are particularly preferred. Regarding the titanium dioxide, rutile-type titanium dioxide having a high refractive index is particularly preferred. In order to impart dispersion stability to the metal oxide particles, the surface of the particles can also be treated with an organic material.

From the viewpoint of transparency of the resin composition, the average primary particle diameter of the metal oxide particles is preferably 1 nm to 200 nm, and particularly preferably 3 nm to 80 nm. Here, the average primary particle diameter of the particles refers to the value obtained by measuring the particle diameters of 200 arbitrary particles using an electron microscope, and determining the arithmetic mean value thereof. Furthermore, in a case in which the shape of the particles is not a spherical shape, the longest edge is considered as the diameter.

Furthermore, the metal oxide particles may be used singly, or two or more kinds thereof may be used in combination.

The content of the metal oxide particles in the resin composition may be appropriately determined in consideration of the refractive index, light-transmitting properties, and the like required for an optical member obtainable from the resin composition.

In regard to the transfer film of the invention, it is preferable that the transparent resin films have at least one of $ZrO_2$ particles or $TiO_2$ particles, from the viewpoint of controlling the refractive indices to the range of the refractive indices of the first curable transparent resin layer and the second curable transparent resin layer, and $ZrO_2$ particles are more preferred.

The resin (also referred to as a binder or a polymer) or other additives used for the transparent resin films are not particularly limited as long as they do not depart from the gist of the invention, and the resin or other additives used for the second curable transparent resin of the transfer film of the invention can be preferably used.

It is preferable that the first curable transparent resin layer and the second curable transparent resin layer each contain an acrylic resin.

The resin (also referred to as a binder or a polymer) used for the first curable transparent resin layer or the second curable transparent resin layer is preferably an alkali-soluble resin, and regarding the alkali-soluble resin, those polymers described in paragraph [0025] of JP2011-95716A and paragraphs [0033] to [0052] of JP2010-237589A can be used. It is more preferable that the first curable transparent resin layer and the second curable transparent resin layer each contain a resin that is an alkali-soluble resin as well as an acrylic resin.

Regarding the polymerizable compound, those polymerizable compounds described in paragraphs [0023] and [0024] of JP4098550B can be used.

Regarding the polymerization initiator or the polymerization initiator system, those polymerizable compounds described in paragraphs [0031] to [0042] described in JP2011-95716A can be used.

Furthermore, additives may also be used for the first curable transparent resin layer and the second curable transparent resin layer. Examples of the additives include the surfactants described in paragraph [0017] of JP4502784B and paragraphs [0060] to [0071] of JP2009-237362A; the thermal polymerization inhibitors described in paragraph [0018] of JP4502784B; and those other additives described in paragraphs [0058] to [0071] of JP2000-310706A.

Furthermore, regarding the solvent used when a photosensitive film is produced by coating, the solvents described in paragraphs [0043] and [0044] of JP2011-95716A can be used.

Thus, the invention has been explained mainly based on the case in which the transfer film of the invention is a negative type material; however, the transfer film of the invention may also be a positive type material. In a case in which the transfer film of the invention is a positive type material, for example, the materials described in JP2005-221726A are used for the first curable transparent resin layer and the second curable transparent resin layer; however, the invention is not intended to be limited to these.

(First Curable Transparent Resin Layer)

In the transfer film of the invention, the refractive index of the first curable transparent resin layer is preferably 1.5 to 1.53, more preferably 1.5 to 1.52, and particularly preferably 1.51 to 1.52.

In regard to the transfer film of the invention, it is preferable that the layer thickness of the first curable transparent resin layer is 1 μm or more, more preferably 1 μm to 10 μm, particularly preferably 2 μm to 9 μm, and more particularly preferably 3 μm to 8 μm, from the viewpoint of exhibiting sufficient surface protective ability in the case of forming a transparent protective layer for a capacitance-type input device using the first curable transparent resin layer.

Regarding the material for the first curable transparent resin layer, any arbitrary polymer component or any arbitrary polymerizable compound component can be used without any particular limitations; however, from the viewpoint of using the first curable transparent resin layer as a transparent protective film for a capacitance-type input device, a material having high surface hardness and high heat resistance is preferred. Among the alkali-soluble resins or polymerizable compounds that are included in the first curable transparent resin layer and the second curable transparent resin layer, known photosensitive siloxane resin materials, acrylic resin materials, and the like are preferably used.

In regard to the transfer film of the invention, it is preferable that the first curable transparent resin layer includes a polymerizable compound and a photopolymerization initiator, from the viewpoint of increasing the film strength or the like after photocuring, or from the viewpoint of increasing the double bond consumption rate of the first curable transparent resin layer by photocuring the first curable transparent resin layer during the period from after the formation of the first curable transparent resin layer until the formation of the second curable transparent resin layer, clarifying the interface between the first curable transparent resin layer and the second curable transparent resin layer, and thereby further improving the visibility of the transparent electrode pattern.

In the first curable transparent resin layer, it is preferable that the photopolymerization initiator is included at a proportion of 1% by mass or more, more preferably at a proportion of 2% by mass or more, and particularly preferably at a proportion of 3% by mass or more, relative to the solid content of the first curable transparent resin layer.

Furthermore, it is preferable that the content of the photopolymerization initiator in the first curable transparent resin layer is larger than the content of the photopolymerization initiator in the second curable transparent resin layer, from the viewpoint of appropriately performing photocuring of the first curable transparent resin layer during the period from after the formation of the first curable transparent resin layer until the formation of the second curable transparent resin layer. It is preferable that the content of the photopolymerization initiator in the first curable transparent resin layer is adjusted to 1.5 times or more, more preferably 1.5 times to 5 times, and particularly preferably 2 times to 4 times, the content of the photopolymerization initiator in the second curable transparent resin layer.

The first curable transparent resin layer may or may not include metal oxide particles. In order to control the refractive index of the first curable transparent resin layer to the range described above, the first curable transparent resin layer may include metal oxide particles at an arbitrary proportion, depending on the kind of the polymer or polymerizable compound used therein. In the first curable transparent resin layer, it is preferable that the metal oxide particles are included at a proportion of 0% by mass to 35% by mass, and more preferably at a proportion of 0% by mass to 10% by mass, relative to the solid content of the first curable transparent resin layer, and it is particularly preferable that metal oxide particles are not included. It is preferable that the first curable transparent resin layer contains metal oxide particles at a proportion of 0% by mass to 10% by mass relative to the total solid content of the first curable transparent resin layer, from the viewpoint of easily solving the problem that a transparent electrode pattern is visually recognized, by lowering the refractive index of the first curable transparent resin layer. It is more preferable that the first curable transparent resin layer contains metal oxide particles at a proportion of 0% by mass to 5% by mass, it is particularly preferable that the first curable transparent resin layer contains metal oxide particles at a proportion of 0% by mass to 1% by mass, and it is more particularly preferable that the first curable transparent resin layer does not contain any metal oxide particles.

According to the present specification, the method for measuring the content of metal oxide particles in the transparent film that will be described below, the first curable transparent resin layer, or the second curable transparent resin layer, is as follows.

A cross-section of a transfer film or a transparent laminate that will be described below is cut, and then the cross-section is observed with a transmission electron microscope (TEM). The proportion of the area occupied by metal oxide particles in a film cross-sectional area of the transparent film that will be described below, the first curable transparent resin layer, or the second curable transparent resin layer is measured at any arbitrary three sites within the layer, and the average value thereof is designated as the volume fraction (VR).

The volume fraction (VR) and the weight fraction (WR) are converted by the following formula, and thereby the weight fraction (WR) of metal oxide particles in the transparent film that will be described below, the first curable transparent resin layer, or the second curable transparent resin layer is calculated.

$$WR=1/(1.1*(1/(D*VR)-1)+1)$$

D: specific gravity of metal oxide particles

In a case in which the metal oxide particles are titanium oxide particles, calculation can be performed by taking D=4.0, and in the case of zirconium oxide particles, calculation can be performed by taking D=6.0.

(Second Curable Transparent Resin Layer)

The transfer film of the invention has a second curable transparent resin layer that is disposed adjacently to the first curable transparent resin layer to be in direct contact therewith, has a higher refractive index than the refractive index of the first curable transparent resin layer, and has a refractive index of 1.6 or higher.

In regard to the transfer film of the invention, it is preferable that the refractive index of the second curable transparent resin layer is 1.65 or higher.

On the other hand, the upper limit value of the refractive index of the second curable transparent resin layer is not particularly limited; however, the refractive index is preferably 1.85 or lower for practical use, and may be 1.74 or lower.

Particularly, in a case in which the transparent electrode is formed from ITO, it is preferable that the second curable transparent resin layer contains zirconium oxide or titanium oxide as the metal oxide particles that will be described below. In a case in which the transparent electrode is formed from an oxide of In and Zn (indium zinc oxide; IZO), the refractive index is preferably from 1.7 to 1.85. In a case in which the refractive index of the second curable transparent resin layer is higher than 1.75, it is preferable that the second curable transparent resin layer contains rutile type titanium dioxide as the metal oxide particles that will be described below. Regarding the rutile type titanium dioxide, for example, LDC-003 manufactured by Ishihara Sangyo Kaisha, Ltd. can be preferably used.

In regard to the transfer film of the invention, the film thickness of the second curable transparent resin layer is preferably 500 nm or less, and more preferably 110 nm or less. It is particularly preferable that the thickness of the second curable transparent resin layer is 55 nm to 110 nm, more particularly preferably 60 nm to 110 nm, and even more particularly preferably 70 nm to 110 nm.

In regard to the transfer film of the invention, it is preferable that the second curable transparent resin layer includes a polymerizable compound, from the viewpoint of increasing the film strength or the like by curing the polymerizable compound.

It is preferable that the second curable transparent resin layer contains fine particles having a refractive index of 1.55 or higher. The second curable transparent resin layer may or may not include metal oxide particles; however, it is preferable that the second curable transparent resin layer includes metal oxide particles, from the viewpoint of controlling the refractive index of the second curable transparent resin layer to the range described above, and it is more preferable that the second curable transparent resin layer includes metal oxide particles having a refractive index of 1.55 or higher. The second curable transparent resin layer may include metal oxide particles at any arbitrary proportion depending on the kind of the polymer or polymerizable compound used; however, it is preferable that in the second curable transparent resin layer, the metal oxide particles are included at a proportion of 28.1% by mass to 95% by mass, more preferably at a proportion of 40% by mass to 95% by mass, particularly preferably at a proportion of 50% by mass to 90% by mass, and more particularly preferably at a proportion of 55% by mass to 85% by mass, relative to the solid content of the second curable transparent resin layer. In a case in which the metal oxide particles are zirconium oxide particles, it is preferable that the second curable transparent resin layer contains the metal oxide particles at a proportion of 28.1% by mass to 95% by mass, more preferably at a proportion of 40% by mass to 95% by mass, particularly preferably at a proportion of 50% by mass to 90% by mass, more particularly preferably at a proportion of 55% by mass to 85% by mass, even more particularly preferably at a proportion of more than 57.0% by mass and 72.4% by mass or less, and most preferably at a proportion of 59.9% by mass to 72.4% by mass, relative to the total solid content of the second curable transparent resin layer. In a case in which the metal oxide particles are titanium oxide particles, it is preferable that the second curable transparent resin layer contains the metal oxide particles at a proportion of 30% by mass to 70% by mass relative to the total solid content of the second curable transparent resin layer.

(Viscosity of Photocurable Resin Layer)

It is preferable that the viscosity of the photocurable resin layer measured at 100° C. is in the range of 2,000 Pa·sec to 50,000 Pa·sec.

Here, the viscosity of each layer can be measured as follows. The solvent is removed from a coating liquid for a photocurable resin layer by drying at the atmospheric pressure and under reduced pressure, the residue is used as a measurement sample, and the viscosity is measured using, for example, a VIBRON (Model DD-III; manufactured by Toyo Baldwin Co., Ltd.) as a measurement instrument, under the conditions of a measurement initiation temperature of 50° C., a measurement completion temperature of 150° C., a rate of temperature increase of 5° C./min, and a vibration frequency of 1 Hz/deg. Thus, the measured value at 100° C. can be used.

Figure 12:
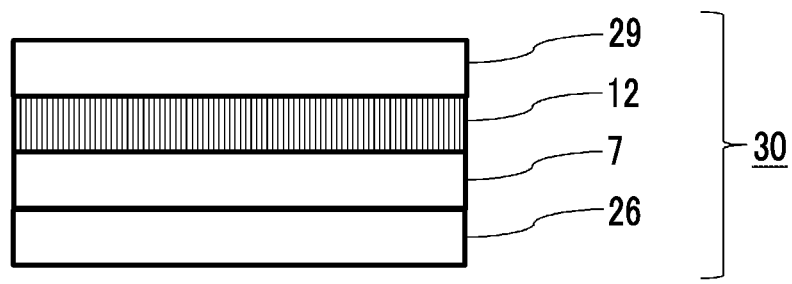
FIG. 12 is a schematic cross-sectional view illustrating an example of the configuration of the transfer film of the invention.

FIG. 12 illustrates an example of a preferred configuration of the transfer film of the invention. FIG. 12 is an outline diagram of a transfer film 30 of the invention, in which a temporary support 26, a first curable transparent resin layer 7, a second curable transparent resin layer 12, and a protective release layer (protective film) 29 are laminated in this order adjacently to each other.

[Method for Producing Transfer Film]

The transfer film of the invention can be produced according to the methods for producing a photosensitive transfer material described in paragraphs [0094] to [0098] of JP2006-259138A. Among them, the transfer film of the invention is preferably produced according to the following method for producing a transfer film of the invention.

A first embodiment of the method for producing a transfer film of the invention has (b) a step of forming, on a temporary support, a first curable transparent resin layer including a polymerizable compound and a photopolymerization initiator such that the temporary support and the first curable transparent resin layer are brought into direct contact with each other; (c) a step of curing the first curable transparent resin layer by exposure to light; and (d) a step of forming a second thermosetting transparent resin layer directly on the first curable transparent resin layer after curing, and the refractive index of the second curable transparent resin layer is higher than the refractive index of the first curable transparent resin layer, while the second curable transparent resin layer contains metal oxide particles at a proportion of 28.1% by mass to 95% by mass relative to the total solid content of the second curable transparent resin layer.

A second embodiment of the method for producing a transfer film of the invention has (b) a step of forming, on a temporary support, a first curable transparent resin layer including a polymerizable compound and a photopolymerization initiator such that the temporary support and the first curable transparent resin layer are brought into direct contact with each other; (c) a step of curing the first curable transparent resin layer by exposure to light; and (d) a step of forming a second thermosetting transparent resin layer directly on the first curable transparent resin layer after curing, and the first curable transparent resin layer contains metal oxide particles at a proportion of 0% by mass to 10% by mass relative to the total solid content of the first curable transparent resin layer, while the second curable transparent resin layer contains metal oxide particles at a proportion of 28.1% by mass to 95% by mass relative to the total solid content of the second curable transparent resin layer.

Based on these configurations, the double bond consumption rate of the first curable transparent resin layer can be increased up to 10% or more, the interface between the first curable transparent resin layer and the second curable transparent resin layer can be clarified, and visibility of the transparent electrode pattern can be further improved. Particularly, even in a case in which the same polymer and polymerizable compound are used in the first curable transparent resin layer and the second curable transparent resin layer, the interface between the two layers can be clarified by such a configuration.

[Transparent Laminate]

A first embodiment of the transparent laminate of the invention has a transparent electrode pattern; a second curable transparent resin layer disposed adjacently to the transparent electrode pattern; and a first curable transparent resin layer disposed adjacently to the second curable transparent resin layer, and the refractive index of the second curable transparent resin layer is higher than the refractive index of the first curable transparent resin layer, while the second curable transparent resin layer contains metal oxide particles at a proportion of 28.1% by mass to 95% by mass relative to the total solid content of the second curable transparent resin layer.

A second embodiment of the transparent laminate of the invention has a transparent electrode pattern; a second curable transparent resin layer disposed adjacently to the transparent electrode pattern; and a first curable transparent resin layer disposed adjacently to the second curable transparent resin layer, and the first curable transparent resin layer contains metal oxide particles at a proportion of 0% by mass to 10% by mass relative to the total solid content of the first curable transparent resin layer, while the second curable transparent resin layer contains metal oxide particles at a proportion of 28.1% by mass to 95% by mass relative to the total solid content of the second curable transparent resin layer.

Based on these configurations, the problem that the transparent electrode pattern is visually recognized can be solved.

In regard to the transparent laminate of the invention, it is preferable that the double bond consumption rate of the first curable transparent resin layer is 10% or higher, from the viewpoint that the interface between the first curable transparent resin layer and the second curable transparent resin layer can be easily formed, and visibility of the transparent electrode pattern is further improved.

<Configuration of Transparent Laminate>

The transparent laminate of the invention may further have a transparent film containing a metal oxide and having a film thickness of 55 nm to 110 nm, a transparent film having a refractive index of 1.6 to 1.80 and a film thickness of 55 nm to 110 nm, or a known hard coat layer, on the opposite side of the side of the transparent electrode pattern where the second curable transparent resin layer is formed. It is preferable that the transparent laminate of the invention further has a transparent film having a refractive index of 1.6 to 1.80 and a film thickness of 55 nm to 110 nm, from the viewpoint of further improving the visibility of the transparent electrode pattern. Meanwhile, in the present specification, unless particularly stated otherwise, in a case in which the term "transparent film" is described, this refers to the "transparent film containing a metal oxide and having a film thickness of 55 nm to 110 nm" or the "transparent film having a refractive index of 1.6 to 1.80 and a film thickness of 55 nm to 110 nm" as described above.

It is preferable that the transparent laminate of the invention further has a transparent substrate on the opposite side of the side where the transparent electrode pattern of a transparent film containing a metal oxide and having a film thickness of 55 nm to 110 nm or a transparent film having a refractive index of 1.6 to 1.80 and a film thickness of 55 nm to 110 nm, is formed. The transparent substrate is preferably a transparent film substrate. In this case, it is preferable that the transparent film is disposed between the transparent electrode pattern and the transparent film substrate.

Furthermore, in the transparent laminate of the invention, the transparent electrode pattern is preferably a transparent electrode pattern formed on a transparent film substrate.

Figure 11:
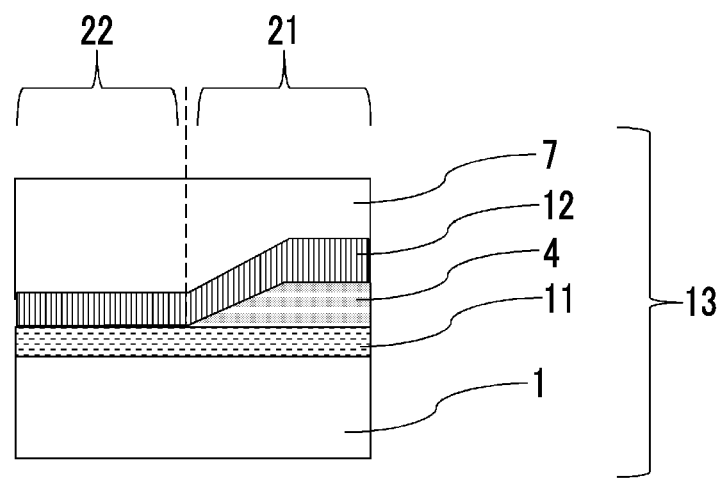
FIG. 11 is a schematic cross-sectional view illustrating an example of the configuration of the transparent laminate of the invention.

FIG. 11 illustrates an example of the configuration of the transparent laminate of the invention.

In FIG. 11, the transparent laminate 13 of the invention has a transparent substrate 1, a transparent film 11 containing a metal oxide and having a film thickness of 55 nm to 110 nm, and a transparent film 11 having a refractive index of 1.6 to 1.80 and a film thickness of 55 nm to 110 nm, and further has an in-plane region 21 in which a transparent electrode pattern 4, a second curable transparent resin layer 12 and a first curable transparent resin layer 7 are laminated in this order.

"In-plane" means a direction approximately parallel to the plane that is parallel to the transparent substrate of the transparent laminate. "Including an in-plane region in which a transparent electrode pattern 4, a second curable transparent resin layer 12, and a first curable transparent resin layer 7 are laminated in this order" implies that orthographic projection for a region in which a transparent electrode pattern 4, a second curable transparent resin layer 12 and a first curable transparent resin layer 7 are laminated in this order, onto a plane that is parallel to the transparent substrate of the transparent laminate, exists in the plane that is parallel to the transparent substrate of the transparent laminate.

Figure 3:
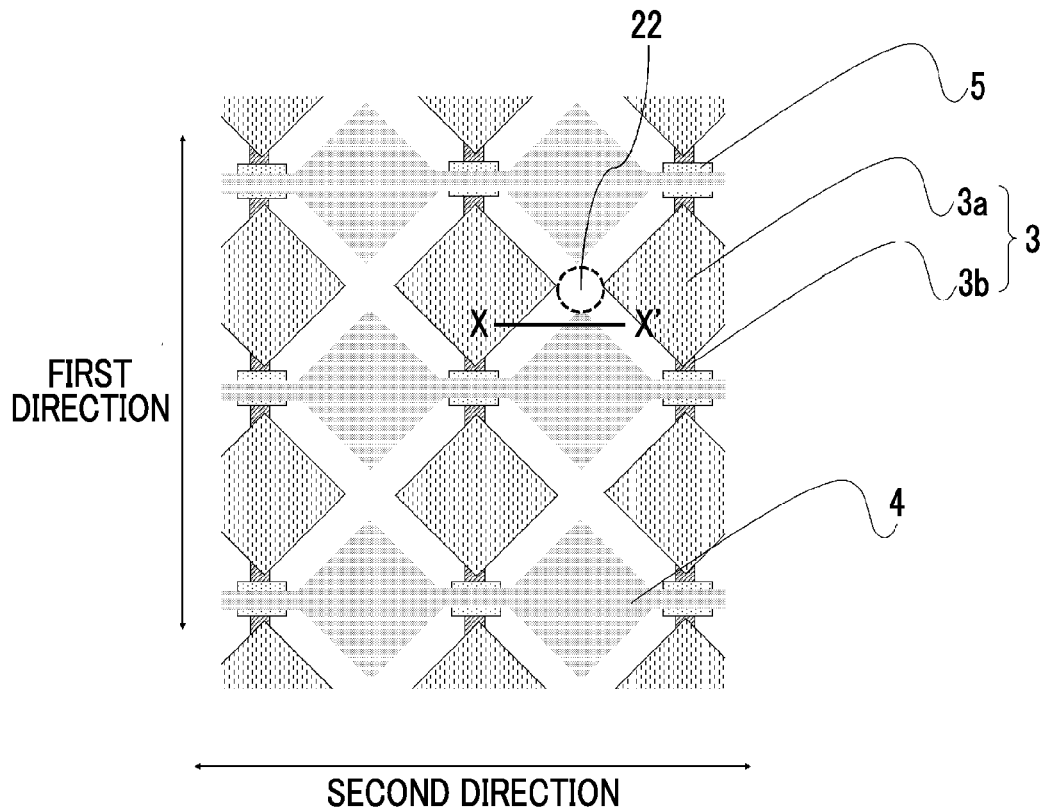
FIG. 3 is an explanatory diagram illustrating an example of the relationship between a transparent electrode pattern and a non-patterned region according to the invention.

Here, in a case in which the transparent laminate of the invention is used in a capacitance-type input device that will be described below, the transparent electrode pattern may be provided as a first transparent electrode pattern and a second transparent electrode pattern respectively in two directions that are approximately perpendicular to each other, namely, a transverse direction and a longitudinal direction (see, for example, FIG. 3). For example, in the configuration of FIG. 3, the transparent electrode pattern in the transparent laminate of the invention may be a second transparent electrode pattern 4, or may be a pad portion 3a of a first transparent electrode pattern 3. In other words, in the following explanation for the transparent laminate of the invention, the reference numeral for the transparent electrode pattern may be representatively indicated by "4"; however, the transparent electrode pattern in the transparent laminate of the invention is not intended to be limited to the use in the second transparent electrode pattern 4 in the capacitance-type input device of the invention, and may also be used as, for example, a pad portion 3a of the first transparent electrode pattern 3.

It is preferable that the transparent laminate of the invention includes a non-patterned region in which a transparent electrode pattern is not formed. In the present specification, a non-patterned region means a region in which the transparent electrode pattern 4 is not formed.

FIG. 11 illustrates an embodiment in which the transparent laminate of the invention includes a non-patterned region 22.

In regard to the transparent laminate of the invention, it is preferable that an in-plane region in which a transparent substrate, a transparent film, and a second curable transparent resin layer are laminated in this order, is included in at least a portion of the non-patterned region 22 in which a transparent electrode pattern is not formed.

In regard to the transparent laminate of the invention, it is preferable that in the region in which a transparent substrate, a transparent film, and a second curable transparent resin layer are laminated in this order, the transparent film and the second curable transparent resin layer are adjacent to each other.

However, in regions other than the non-patterned region 22, other members may be disposed at arbitrary positions as long as they do not depart from the gist of the invention, and for example, in a case in which the transparent laminate of the invention is used in the capacitance-type input device that will be described below, a mask layer 2, an insulating layer 5, an conductive element 6, or the like can be laminated thereon.

In regard to the transparent laminate of the invention, it is preferable that the transparent substrate and the transparent film are adjacent to each other.

FIG. 11 illustrates an embodiment in which a transparent film 11 is laminated on a transparent substrate 1 adjacently thereto.

However, as long as they do not depart from the gist of the invention, a third transparent film may be laminated between the transparent substrate and the transparent film. For example, it is preferable that a third transparent film (not shown in FIG. 11) having a refractive index of 1.5 to 1.52 is included between the transparent substrate and the transparent film.

In regard to the transparent laminate of the invention, the thickness of the transparent film is 55 nm to 110 nm, preferably 60 nm to 110 nm, and more preferably 70 nm to 110 nm.

Here, the transparent film may have a single-layer structure, or may have a laminated structure of two or more layers. In a case in which the transparent film has a laminated structure of two or more layers, the film thickness of the transparent film means the total film thickness of all the layers.

In regard to the transparent laminate of the invention, it is preferable that the transparent film and the transparent electrode pattern are adjacent to each other.

FIG. 11 illustrates an embodiment in which the transparent electrode pattern 4 is laminated on a portion of a region of the transparent film 11 adjacently thereto.

As illustrated in FIG. 11, the shape of the edge of the transparent electrode pattern 4 is not particularly limited; however, the edge may have a tapered shape, and for example, the edge may have a tapered shape in which the plane on the transparent substrate side is larger than the plane on the opposite side of the transparent substrate.

Here, when the edge of the transparent electrode pattern has a tapered shape, the angle of the edge of the transparent electrode pattern (hereinafter, also called taper angle) is preferably 30° or less, more preferably 0.1° to 15°, and particularly preferably 0.5° to 5°.

In the present specification, the taper angle can be measured by a method in which a microscopic photograph of the edge of the transparent electrode pattern is captured; the tapered portion in the microscopic photograph is approximated to a triangle; and the taper angle thereof is directly measured.

Figure 10:
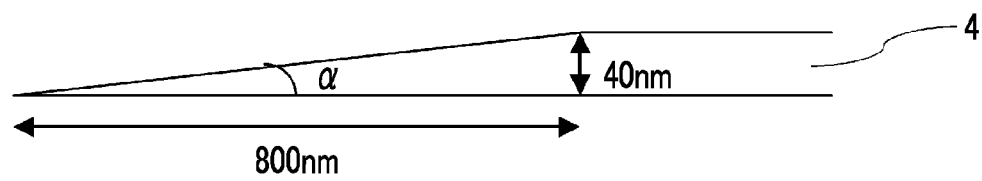
FIG. 10 is an explanatory diagram illustrating an example of a tapered shape of an edge of a transparent electrode pattern.

FIG. 10 illustrates an example of the case in which an edge of the transparent electrode pattern has a tapered shape. The triangle approximating the taper part in FIG. 10 has an underside of 800 nm and a height (film thickness at the upper base part that is approximately parallel to the underside) of 40 nm, and the taper angle α at this time is about 3°. The underside of the triangle approximating the taper part is preferably 10 nm to 3,000 nm, more preferably 100 nm to 1,500 nm, and particularly preferably 300 nm to 1,000 nm. Meanwhile, a preferred range of the height of the triangle approximating the taper part is similar to the preferred range of the film thickness of the transparent electrode pattern.

It is preferable that the transparent laminate of the invention includes an in-plane region in which the transparent electrode pattern and the second curable transparent resin layer are adjacent to each other.

FIG. 11 illustrates an embodiment in which in the region 21 in which a transparent electrode pattern, a second curable transparent resin layer, and a first curable transparent resin layer are laminated in this order, the transparent electrode pattern, the second curable transparent resin layer, and the first curable transparent resin layer are adjacent to each other.

Furthermore, in regard to the transparent laminate of the invention, it is preferable that both the transparent electrode pattern and the non-patterned region 22 in which the transparent electrode pattern is not formed are continuously covered, directly or with another layer interposed therebetween, by the transparent film and the second curable transparent resin layer.

Here, the term "continuously" means that the transparent film and the second curable transparent resin layer are not patterned films but are continuous films. That is, it is preferable that the transparent film and the second curable transparent resin layer do not have openings, from the viewpoint of making the transparent electrode pattern not easily visually recognized.

Furthermore, it is preferable that the transparent electrode pattern and the non-patterned region 22 are directly covered by the transparent film and the second curable transparent resin layer, rather than being covered with another layer interposed therebetween. The "other layer" in the case in which the transparent electrode pattern and the non-patterned region are covered with another layer interposed therebetween, may be an insulating layer 5 that is included in the capacitance-type input device of the invention that will be described below, and in a case in which two or more layers of transparent electrode patterns are included as in the case of the capacitance-type input device of the invention that will be described below, the "other layer" may be a transparent electrode pattern of the second layer.

FIG. 11 illustrates an embodiment in which the second curable transparent resin layer 12 is laminated across the region in which the transparent electrode pattern 4 is not laminated on the transparent film 11, and the transparent electrode pattern 4, respectively adjacently to the two parts.

Furthermore, in a case in which the edge of the transparent electrode pattern 4 has a tapered shape, it is preferable that the second curable transparent resin layer 12 is laminated along the tapered shape (at the same gradient as the taper angle).

FIG. 11 illustrates an embodiment in which the first curable transparent resin layer 7 is laminated on the surface on the opposite side of the surface on which the transparent electrode pattern of the second curable transparent resin layer 12 is formed.

<Material for Transparent Laminate>
(Transparent Substrate)

It is preferable that the transparent laminate of the invention has a transparent substrate. The transparent substrate may be a transparent glass substrate, or may be a transparent film substrate; however, it is preferable that the transparent substrate is a transparent film substrate having a refractive index of 1.5 to 1.55. The refractive index of the transparent substrate is particularly preferably 1.5 to 1.52.

Here, in a sensor of a capacitance-type input device, in which a frame-like light shielding layer is formed together with the transparent electrode on the transparent substrate, a large level difference is provided between the frame portion and the frame inner portion in order to obtain light shielding performance of the frame portion. Due to this level difference, when a transfer material is bonded onto the transparent substrate, bubbles (foaming) easily occur, and it is necessary to devise a configuration which sufficiently conforms to the level difference on the side of the transfer material. As an example of such devise, for example, it is known to use a transfer material in which a thermoplastic resin layer is laminated on a temporary support in addition to a transfer layer (see JP2014-10814A). On the other hand, in the film sensors described in JP2013-214173A and JP2011-123915A, since a frame-like light shielding layer is not formed on the substrate, there is no problem of shape conformity to a level difference, and transfer can be easily achieved even if a transfer film having a thermoplastic resin layer laminated thereon is not used. The transfer film of the invention can be particularly preferably used in the case of producing a transparent laminate or a capacitance-type input device, in which the transparent substrate is a transparent film substrate. In the case of producing a transparent laminate or a capacitance-type input device, in which the transparent substrate is a transparent film substrate, it is preferable to use the transfer film of the invention in which a thermoplastic resin layer is not laminated, rather than a transfer film in which a thermoplastic resin layer is laminated, from the viewpoint that at the time of transfer, when the film is heated and pressurized, bleeding of resin from the edges of the film does not easily occur.

In a case in which the transparent substrate is a transparent glass substrate (also referred to as light-transmitting substrate of glass), reinforced glass, which is represented by Gorilla glass of Corning, Inc., or the like can be used. Also, regarding the transparent substrate, the materials used in JP2010-86684A, JP2010-152809A, and JP2010-257492A can be preferably used, the disclosures of which are incorporated herein.

In a case in which the transparent substrate is a transparent film substrate, it is preferable that the transparent film substrate is a transparent resin film. Regarding the resin material that forms a transparent resin film, it is more preferable to use a resin material which has no optical distortion, or a resin material which has high transparency. Specific examples thereof include a poly(meth)acrylic resin, a triacetyl cellulose (TAC)-based resin, a polyethylene terephthalate (PET)-based resin, polyethylene naphthalate, a polycarbonate-based resin, and a cycloolefin-based resin. Among them, from the viewpoint of general-purpose usability, a triacetyl cellulose (TAC)-based resin, a polyethylene terephthalate (PET)-based resin, and a cycloolefin-based resin are preferred. The thickness of the transparent resin film is preferably in the range of 2 μm to 200 μm, and more preferably in the range of 2 μm to 100 μm. When the thickness is 2 μm or more, the film substrate has sufficient mechanical strength, and the handling operation of the rolls is made easier. On the other hand, when the thickness is 200 μm or less, the bending characteristics are enhanced, and the handling operation of the rolls is made easier.

(Transparent Electrode Pattern)

The refractive index of the transparent electrode pattern is preferably 1.75 to 2.1.

The material for the transparent electrode pattern is not particularly limited, and any known material can be used. For example, the transparent electrode pattern can be produced with a light-transmitting conductive metal oxide film of ITO (Indium Tin Oxide), IZO (Indium Zinc Oxide) or the like. Since oxides of Zn (IZO) or a transparent conductive film containing these oxides as main components has an advantage that the etching rate is higher than that of an ITO film, attention is paid according to the use. Examples of such a metal film include an ITO film; a metal film of Al, Zn, Cu, Fe, Ni, Cr, Mo or the like; and a metal oxide film of $SiO_2$ or the like. At this time, the film thickness of each element can be adjusted to 10 nm to 200 nm. Furthermore, since an amorphous ITO film is converted to a polycrystalline ITO film by calcination, the electrical resistance can be reduced. Also, the first transparent electrode pattern 3, the second transparent electrode pattern 4, and the conductive element 6 that will be described below can be produced using a photosensitive film having a photocurable resin layer using conductive fibers. In addition to that, in a case in which a first conductive pattern or the like is formed using ITO or the like, reference can be made to the description in paragraphs to [0016] of JP4506785B. Above all, the transparent electrode pattern is preferably an ITO film or an IZO film, and particularly preferably an ITO film.

In the transparent laminate of the invention, the transparent electrode pattern is preferably an ITO film having a refractive index of 1.75 to 2.1.

(Hard Coat Layer)

Between the transparent substrate and the transparent electrode pattern, a hard coat layer may be introduced, instead of the transparent film containing a metal oxide and having a film thickness of 55 nm to 110 nm or a transparent film having a refractive index of 1.6 to 1.80 and a film thickness of 55 nm to 110 nm, as described above. The hard coat layer can be formed by a dry process such as a vacuum vapor deposition method, a sputtering method, or an ion plating method, or by a wet method (coating method). Regarding the wet method (coating method), a coating method using a roll coater, a reverse roll coater, a gravure coater, a microgravure coater, a knife coater, a bar coater, a wire bar coater, a die coater, or a dip coater can be used.

The hard coat layer is introduced from the viewpoint of easy sliding properties or hardness enhancement, and the hard coat layer is formed by, for example, a cured product obtained by curing a curable composition containing a reactive silicon compound such as tetraethoxysilane, a polyfunctional (meth)acrylate or the like by means of heat, ultraviolet radiation (UV) or ionizing radiation. Furthermore, inorganic particles such as colloidal silica may also be added to the hard coat layer, and the refractive index of the hard coat layer is adjusted to about 1.45 to 1.55.

(Formation of Transparent Electrode Pattern on Both Surfaces of Transparent Substrate)

The transparent electrode pattern can be formed on one surface or on both surfaces of the transparent substrate. When an electrode pattern is formed on both surfaces of the transparent substrate, the hard coat layer and the optical adjustment layer formed between the transparent substrate and the transparent electrode pattern may be formed such that the thickness or the layer configuration is symmetrical on both surfaces, or the hard coat layer and the optical adjustment layer may be formed such that the thickness or the layer configuration is asymmetric. In a case in which the transparent electrode pattern is formed on both surfaces, it is preferable that the first curable transparent resin layer and the second curable transparent resin layer included in the transfer film of the invention are transferred onto both surfaces.

That is, it is preferable that the laminate of the invention has a transparent electrode pattern, a second curable transparent resin layer, and a first curable transparent resin layer, respectively on both surfaces of the transparent film substrate. An example of the configuration of the transparent laminate in this case is illustrated in FIG. 1A.

(First Curable Transparent Resin Layer and Second Curable Transparent Resin Layer)

The preferred ranges for the first curable transparent resin layer and the second curable transparent resin layer are similar to the preferred ranges for the first curable transparent resin layer and the second curable transparent resin layer in the transfer film of the invention.

(Transparent Film)

In regard to the transparent laminate of the invention, the refractive index of the transparent film is preferably 1.6 to 1.80, more preferably 1.6 to 1.78, and particularly preferably 1.65 to 1.74. Here, the transparent film may have a single layer structure, or may have a laminated structure of two or more layers. In a case in which the transparent film has a laminated structure of two or more layers, the refractive index of the transparent film means the refractive index of the entire layers.

As long as such a range of the refractive index is satisfied, the material for the transparent film is not particularly limited.

A preferred range of the material for the transparent film and preferred ranges of the physical properties such as the refractive index are similar to the preferred ranges of those properties of the second curable transparent resin layer.

In regard to the transparent laminate of the invention, it is preferable that the transparent film and the second curable transparent resin layer are constructed from the same material, from the viewpoint of optical homogeneity.

It is preferable that the transparent film contains a metal oxide, and it is more preferable that the transparent film contains metal oxide particles at a proportion of 5% by mass to 80% by mass, and particularly more preferably at a proportion of 10% by mass to 70% by mass, as a metal oxide.

In regard to the transparent laminate of the invention, it is preferable that the transparent film is a transparent resin film. The metal oxide particles, resin (binder), and other additives that are used for the transparent resin film are not particularly limited as long as they do not depart from the gist of the invention, and the resins or other additives that are used for the second curable transparent resin in the transfer film of the invention can be preferably used.

In regard to the transparent laminate of the invention, the transparent film may be an inorganic film. Regarding the material used for the inorganic film, the materials used for the second curable transparent resin in the transfer film of the invention can be preferably used.

(Third Transparent Film)

The refractive index of the third transparent film is preferably 1.5 to 1.55 from the viewpoint of adjusting the refractive index of the third transparent film close to the refractive index of the transparent substrate and improving visibility of the transparent electrode pattern, and it is more preferable that the refractive index of the third transparent film is 1.5 to 1.52.

[Method for Producing Transparent Laminate]

The method for producing a transparent laminate of the invention includes a step of laminating, on a transparent electrode pattern, the second curable transparent resin layer and the first curable transparent resin layer of the transfer film of the invention in this order.

Based on such a configuration, the second curable transparent resin layer and the first curable transparent resin layer of the transparent laminate can be transferred all at once, and a transparent laminate that is free of the problem that the transparent electrode pattern is visually recognized can be produced easily with satisfactory productivity.

Meanwhile, in the method for producing a transparent laminate of the invention, the second curable transparent resin layer is produced on the transparent electrode pattern, and on the transparent film in the non-patterned region, directly or with another layer interposed therebetween.

In regard to the method for producing a transparent laminate of the invention, it is preferable that the transparent electrode pattern is a transparent electrode pattern formed on a transparent film substrate.

(Surface Treatment of Transparent Substrate)

Furthermore, in order to increase the adhesiveness of various layers by lamination in the subsequent transfer process, the non-contact surface of the transparent substrate (transparent film substrate or front face plate) can be subjected to a surface treatment in advance. Regarding the surface treatment, it is preferable to perform a surface treatment using a silane compound (silane coupling treatment). Regarding the silane coupling agent, an agent having a functional group that interacts with a photosensitive resin is preferred. For example, a silane coupling liquid (0.3 mass % aqueous solution of N-β(aminoethyl)γ-aminiopropyltrimethoxysilane, trade name: KBM603, manufactured by Shin-Etsu Chemical Co., Ltd.) is sprayed for 20 seconds by showering, and the surface is washed by showering with pure water. Subsequently, the surface is caused to react by heating. A heating chamber may be used, or the reaction can be accelerated by substrate preliminary heating of a laminator.

(Film Formation of Transparent Electrode Pattern)

The transparent electrode pattern can be formed on a transparent substrate, or on a transparent film containing a metal oxide and having a film thickness of 55 nm to 110 nm or a transparent film having a refractive index of 1.6 to 1.80 and a film thickness of 55 nm to 110 nm, using the method for forming the first transparent electrode pattern 3, the second transparent electrode pattern 4 and other conductive element 6, or the like as described in the description of the capacitance-type input device of the invention that will be described below. A method of using a photosensitive film is preferred.

(Film Formation of First Curable Transparent Resin Layer and Second Curable Transparent Resin Layer)

The method for forming a first curable transparent resin layer and a second curable transparent resin layer may be a method including a protective film removal step of removing a protective film from the transfer film of the invention; a transfer step of transferring the first curable transparent resin layer and the second curable transparent resin layer of the transfer film of the invention, from which the protective film has been removed, onto a transparent electrode pattern; an exposure step of exposing the first curable transparent resin layer and the second curable transparent resin layer that have been transferred onto the transparent electrode pattern; and a developing step of developing the first curable transparent resin layer and the second curable transparent resin layer, both of which have been exposed to light.

—Transfer Step—

The transfer step is a step of transferring the first curable transparent resin layer and the second curable transparent resin layer of the transfer film of the invention, from which the protective film has been removed, onto a transparent electrode pattern.

At this time, a method including a step of removing the temporary support after laminating the first curable transparent resin layer and the second curable transparent resin layer of the transfer film of the invention onto the transparent electrode pattern, is preferable.

The transfer (bonding) of the first curable transparent resin layer and the second curable transparent resin layer onto the transparent electrode pattern surface is carried out by superposing the first curable transparent resin layer and the second curable transparent resin layer on the transparent electrode pattern, and pressing and heating the assembly. For the bonding, known laminators such as a laminator, a vacuum laminator, and an autocut laminator, which can improve productivity, can be used.

—Exposure Step, Developing Step, and Other Steps—

Regarding the examples of the exposure step, developing step, and other steps, the methods described in paragraphs [0035] to [0051] of JP2006-23696A can also be suitably used for the invention.

The exposure step is a step of exposing the first curable transparent resin layer and the second curable transparent resin layer that have been transferred onto the transparent resin electrode pattern.

Specifically, a method of disposing a predetermined mask above the first curable transparent resin layer and the second curable transparent resin layer formed on the transparent electrode pattern, and then exposing, through the mask, the first curable transparent resin layer and the second curable transparent resin layer from above the mask; or a method of exposing the entire surface of the first curable transparent resin layer and the second curable transparent resin layer without using a mask, may be employed.

Here, regarding the light source for the exposure, any light source which can emit light having a wavelength range capable of curing the first curable transparent resin layer and the second curable transparent resin layer (for example, 365 nm or 405 nm), can be appropriately selected and used. Specific examples thereof include an ultrahigh pressure mercury lamp, a high pressure mercury lamp, and a metal halide lamp. The amount of exposure is usually about 5 $mJ/cm^2$ to 200 $mJ/cm^2$, and preferably about 10 $mJ/cm^2$ to 100 $mJ/cm^2$.

The developing step is a step of developing the first curable transparent resin layer and the second curable transparent resin layer, both of which have been exposed, or the photocurable resin layer of a photosensitive film having a photocurable resin layer used for etching of the transparent electrode pattern.

In this invention, the developing step is not a developing step in a narrow sense of patternwise developing a first curable transparent resin layer and a second curable transparent resin layer, which have been exposed patternwise, using a developer; but is a developing step which also includes the case in which no pattern is formed on the first curable transparent resin layer and the second curable transparent resin layer themselves, by simply removing a thermoplastic resin layer or an intermediate layer after exposure of entire surface.

Developing can be carried out using a developer. The developer is not particularly limited, and any known developer, such as those described in JP1993-72724A (JP-H05-72724A), can be used. Furthermore, the developer is preferably a developer with which a photocurable resin layer exhibits dissolution type developing behavior, and for example, a developer including a compound having a pKa of 7 to 13 at a concentration of 0.05 mol/L to 5 mol/L is preferred. On the other hand, the developer in the case in which the first curable transparent resin layer and the second curable transparent resin layer themselves do not have patterns formed thereon, is preferably a developer which exhibits developing behavior of the type that does not dissolve a non-alkali developing type colored composition layer, and for example, a developer including a compound having a pKa of 7 to 13 at a concentration of 0.05 mol/L to 5 mol/L is preferred. The developer may also include a small amount of an organic solvent which is miscible with water. Examples of the organic solvent that is miscible with water include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethyl phosphoramide, ethyl lactate, methyl lactate, ε-caprolactam, and N-methylpyrrolidone. The concentration of the organic solvent is preferably 0.1% by mass to 30% by mass. Also, known surfactants can be further added to the developer. The concentration of the surfactants is preferably 0.01% by mass to 10% by mass.

The method for developing may be any of paddle developing, shower developing, shower and spinning developing, dip developing, or the like. Here, to explain shower developing, an uncured part can be removed by spraying a developer by showering to the first curable transparent resin layer and the second curable transparent resin layer after exposure. Furthermore, in a case in which a thermoplastic resin layer or an intermediate layer is provided on a photosensitive film having a photocurable resin layer that is used for etching of a transparent electrode pattern, it is preferable to have the thermoplastic resin layer, the intermediate layer or the like removed in advance by spraying an alkaline liquid having low solubility of the photocurable resin layer before developing, by showering or the like. Furthermore, it is preferable to remove, after developing, a developing residue by spraying a detergent or the like by showering and scrubbing with a brush or the like. The liquid temperature of the developer is preferably 20° C. to 40° C., and the pH of the developer is preferably 8 to 13.

The method for producing a capacitance-type input device may include other steps such as a post-exposure step and a post-bake step. In a case in which the first curable transparent resin layer and the second curable transparent resin layer are thermosetting transparent resin layers, it is preferable to carry out a post-bake step.

Furthermore, patterning exposure or full-surface exposure may be carried out after detaching the temporary support, or exposure may be performed before the temporary support is detached, and then the temporary support may be detached. The exposure may be exposure through a mask, or may be digital exposure using a laser or the like.

(Film Formation of Transparent Film)

In a case in which the transparent laminate of the invention further has a transparent film containing a metal oxide and having a film thickness of 55 nm to 110 nm or a transparent film having a refractive index of 1.6 to 1.80 and a film thickness of 55 nm to 110 nm, on the opposite side of the side where the second curable transparent resin layer of the transparent electrode pattern is formed, the transparent film is formed on the transparent electrode pattern, directly thereon or with another layer such as a third transparent film interposed therebetween.

The method for forming the transparent film is not particularly limited; however, it is preferable to form the transparent film by transfer or sputtering.

Above all, in regard to the transparent laminate of the invention, it is preferable that the transparent film is formed by transferring a transparent curable resin film formed on a temporary support, onto a transparent substrate, and it is more preferable that the transparent film is formed by being cured after transfer. The method for performing transfer and curing may be a method of performing transfer, exposure, developing, and other processes similarly to the method of transferring the first curable transparent resin layer and the second curable transparent resin layer in the method for producing a transparent laminate of the invention using a photosensitive film in connection with the explanation on the capacitance-type input device of the invention that will be described below. In that case, it is preferable to adjust the refractive index of the transparent film to the range described above, by dispersing metal oxide particles in the photocurable resin layer in the photosensitive film.

On the other hand, in a case in which the transparent film is an inorganic film, it is preferable that the transparent film is formed by sputtering. That is, in regard to the transparent laminate of the invention, it is preferable that the transparent film is formed by sputtering.

Regarding the sputtering method, the methods used in JP2010-86684A, JP2010-152809A, and JP2010-257492A can be preferably used, the disclosures of which are incorporated herein.

(Film Formation of Third Transparent Film)

The method for forming the third transparent film is similar to the method for forming a transparent film containing a metal oxide and having a film thickness of 55 nm to 110 nm, or a transparent film having a refractive index of 1.6 to 1.80 and a film thickness of 55 nm to 110 nm, on a transparent substrate.

[Capacitance-type Input Device]

The capacitance-type input device of the invention is produced using the transfer film of the invention, or has the transparent laminate of the invention.

It is preferable that the capacitance-type input device of the invention has a transparent laminate which has a transparent electrode pattern; a second curable transparent resin layer disposed adjacently to the transparent electrode pattern; and a first curable transparent resin layer disposed adjacently to the second curable transparent resin layer, in which the refractive index of the second curable transparent resin layer is higher than the refractive index of the first curable transparent resin layer, and the refractive index of the second curable transparent resin layer is 1.6 or higher.

In the following description, the details of a preferred embodiment of the capacitance-type input device of the invention will be described.

It is preferable that the capacitance-type input device of the invention has the transparent laminate of the invention, which has a transparent substrate and at least the following elements of (3) to (5), (7) and (8) on the non-contact side of the transparent substrate:

(3) plural first transparent electrode patterns formed by plural pad portions extending in a first direction through connection parts;

(4) plural second electrode patterns that are electrically insulated from the first transparent electrode patterns, and are composed of plural pad portions formed by extending in a direction perpendicularly intersecting the first direction;

(5) an insulating layer that electrically insulates the first transparent electrode patterns and the second electrode patterns;

(7) a second curable transparent resin layer formed so as to cover the entirety or a portion of the elements of (3) to (5); and (8) a first curable transparent resin layer formed adjacently so as to cover the element of (7).

Here, the (7) second curable transparent resin layer corresponds to the second curable transparent resin layer in the transparent laminate of the invention. Furthermore, the (8) first curable transparent resin layer corresponds to the first curable transparent resin layer in the transparent laminate of the invention. Meanwhile, it is preferable that the first curable transparent resin layer is a so-called transparent protective layer in a conventionally known capacitance-type input device.

In regard to the capacitance-type input device of the invention, the (4) second electrode pattern may be a transparent electrode pattern, or may not be a transparent electrode pattern; however, it is preferable that the second electrode pattern is a transparent electrode pattern.

The capacitance-type input device of the invention may further have the following element of (6):

(6) an conductive element that is electrically connected to at least one of the first transparent electrode pattern or the second electrode pattern and is different from the first transparent electrode pattern and the second electrode pattern.

Here, in a case in which the (4) second electrode pattern is not a transparent electrode pattern, and the capacitance-type input device does not have the (6) other conductive element, the (3) first transparent electrode pattern corresponds to the transparent electrode pattern in the transparent laminate of the invention.

In a case in which the (4) second electrode pattern is a transparent electrode pattern, and the capacitance-type input device does not have the (6) other conductive element, at least one of the (3) first transparent electrode pattern or the (4) second electrode pattern corresponds to the transparent electrode pattern in the transparent laminate of the invention.

In a case in which the (4) second electrode pattern is not a transparent electrode pattern, and the capacitance-type input device has the (6) other conductive element, at least one of the (3) first transparent electrode pattern or the (6) other conductive element corresponds to the transparent electrode pattern in the transparent laminate of the invention.

In a case in which the (4) second electrode pattern is a transparent electrode pattern, and the capacitance-type input device has the (6) other conductive element, at least one of the (3) first transparent electrode pattern, the (4) second electrode pattern, or the (6) other conductive element corresponds to the transparent electrode pattern in the transparent laminate of the invention.

It is preferable that the capacitance-type input device of the invention further has (2) a transparent film between the (3) first transparent electrode pattern and the transparent substrate, between the (4) second electrode pattern and the transparent substrate, or between the (6) other conductive element and the transparent substrate. Here, it is preferable that the (2) transparent film corresponds to the transparent film containing a metal oxide and having a film thickness of 55 nm to 110 nm or the transparent film having a refractive index of 1.6 to 1.80 and a film thickness of 55 nm to 110 nm in the transparent laminate of the invention, from the viewpoint of further improving visibility of the transparent electrode pattern.

It is preferable that the capacitance-type input device of the invention further has (1) a mask layer and/or a decorative layer, if necessary. The mask layer is provided as a black frame around the region that is touched by a finger, a touch pen or the like, in order to make the lead wiring of the transparent electrode pattern invisible from the contact side, or to provide decoration. The decorative layer is provided for the purpose of decoration, and it is preferable to provide, for example, a white decorative layer.

It is preferable that the capacitance-type input device has the (1) mask layer and/or decorative layer between the (2) transparent film and the transparent substrate, between the (3) first transparent electrode pattern and the transparent substrate, between the (4) second electrode pattern and the transparent substrate, or between the (6) other conductive element and the transparent substrate. It is more preferable that the (1) mask layer and/or decorative layer is provided adjacently to the transparent substrate.

Meanwhile, in a case in which the transparent substrate is a transparent film substrate, it is preferable that the (1) mask layer and/or decorative layer is further integrated with a cover glass that is disposed on the visible side of the transparent substrate. In the case of such an embodiment, it is preferable that the transparent laminate of the invention does not have the (1) mask layer and/or decorative layer, from the viewpoint that in a case in which the second curable transparent resin layer and the first curable transparent resin layer are transferred from the transfer film of the invention, the level difference that is causative of the incorporation of gas bubbles can be reduced.

In the capacitance-type input device of the invention, even in a case in which such various members are included, the transparent electrode pattern can be made unnoticeable by including the second curable transparent resin layer disposed adjacently to the transparent electrode pattern, and the first curable transparent resin layer disposed adjacently to the second curable transparent resin layer, and thus the problem of visibility of the transparent electrode pattern can be ameliorated. Furthermore, as described above, by adopting a configuration which sandwiches the transparent electrode pattern by using a transparent film containing a metal oxide and having a film thickness of 55 nm to 110 nm or a transparent film having a refractive index of 1.6 to 1.80 and a film thickness of 55 nm to 110 nm, and the second curable transparent resin layer, the problem of visibility of the transparent electrode pattern can be further ameliorated.

<Configuration of Capacitance-type Input Device>

First, a preferable configuration of the capacitance-type input device of the invention will be explained together with the method for producing various members that constitute the device. FIG. 1A is a cross-sectional view illustrating an example of a preferred embodiment of the transparent laminate or the capacitance-type input device of the invention, the configuration being a configuration of the capacitance-type input device in which the transparent electrode pattern is provided in one direction only. The capacitance-type input device in FIG. 1A is illustrated as an embodiment configured to include a transparent substrate (transparent film substrate) 1; as well as a transparent film containing a metal oxide and having a film thickness of 55 nm to 110 nm or a transparent film 11 having a refractive index of 1.6 to 1.80 and a film thickness of 55 nm to 110 nm; a transparent electrode pattern 4; another conductive element 6; a second curable transparent resin layer 12; and a first curable transparent resin layer 7, which are respectively provided symmetrically on both surfaces of the transparent substrate 1. The transparent laminate or capacitance-type input device of the invention is not intended to be limited to the configuration of FIG. 1A, and an embodiment in which the transparent film 11, the transparent electrode pattern 4, the other conductive element 6, the second curable transparent resin layer 12, and the first curable transparent resin layer 7 are provided on only one surface of the transparent substrate 1, is also preferable.

Figure 1B:
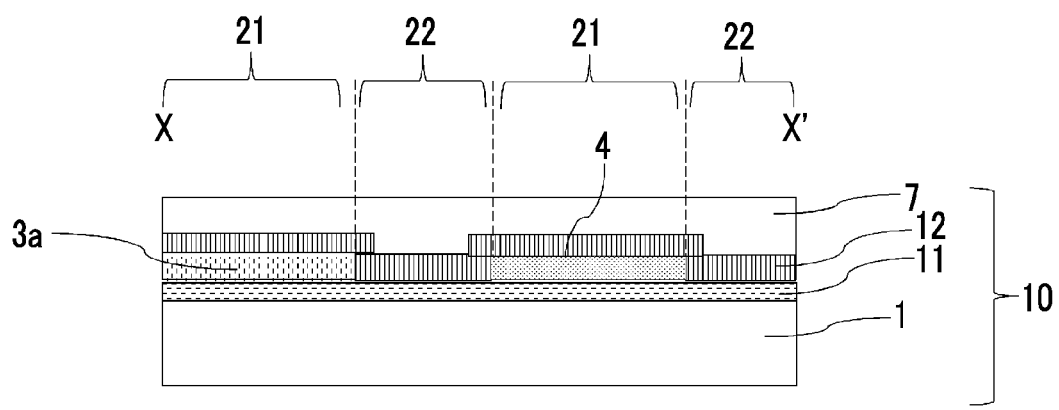
FIG. 1B is a schematic cross-sectional view illustrating another example of the configuration of the capacitance-type input device of the invention.

Furthermore, FIG. 1B, which illustrates the X-X' cross-section in FIG. 3 that will be described below, is a cross-sectional view illustrating an example of a capacitance-type input device in which a first transparent electrode pattern and a second transparent electrode pattern are respectively provided in two directions that approximately perpendicularly intersect each other, namely, a transverse direction and a longitudinal direction, as the transparent electrode pattern, the diagram illustrating a preferable configuration of the capacitance-type input device of the invention. The capacitance-type input device 10 in FIG. 1B is illustrated as an embodiment configured to include a transparent substrate 1; a transparent film containing a metal oxide and having a film thickness of 55 nm to 110 nm or a transparent film 11 having a refractive index of 1.6 to 1.80 and a film thickness of 55 nm to 110 nm; a first transparent electrode pattern 3; a second transparent electrode pattern 4; a second curable transparent resin layer 12; and a first curable transparent resin layer 7.

Regarding the transparent substrate (transparent film substrate or front face plate) 1, the transparent substrate mentioned as a material for the transparent electrode pattern in the transparent laminate of the invention can be used. Furthermore, in FIG. 1A, the side where the various elements of the transparent substrate 1 are provided is called a non-contact surface. In the capacitance-type input device 10 of the invention, an input operation is performed by touching the contact surface (opposite surface of the non-contact surface) of the transparent substrate 1 with a finger or the like.

Furthermore, a mask layer 2 is provided on the non-contact surface of the transparent substrate 1. The mask layer 2 is a frame-shaped pattern around the display region formed on the non-contact side of the touch panel transparent substrate, and this is formed in order to make the lead wiring invisible.

Figure 2:
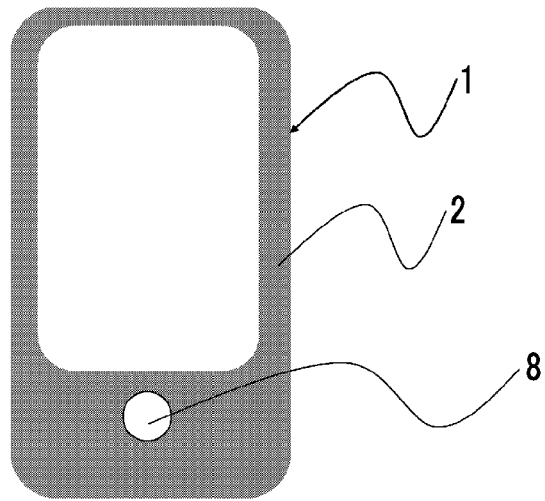
FIG. 2 is an explanatory diagram illustrating an example of the transparent laminate according to the invention.

In the capacitance-type input device 10 of the invention, as illustrated in FIG. 2, the mask layer 2 is provided so as to cover a partial region of the transparent substrate 1 (in FIG. 2, the region other than the input surface). Furthermore, in the transparent substrate 1, an opening 8 may be provided in a section as illustrated in FIG. 2. A mechanical switch operated by pressing can be provided at the opening 8.

On the contact surface of the transparent substrate 1, plural first transparent electrode patterns 3 that are formed by plural pad portions extending in a first direction through connection parts; plural second transparent electrode patterns 4 that are electrically insulated from the first transparent electrode patterns 3, and are composed of plural pad portions formed by extending in a direction perpendicularly intersecting the first direction; and an insulating layer 5 that electrically insulates the first transparent electrode patterns 3 and the second transparent electrode patterns 4, are formed. Regarding the first transparent electrode patterns 3, the second transparent electrode patterns 4, and the conductive element 6 that will be described below, those mentioned as the materials of the transparent electrode pattern for the transparent laminate of the invention can be used, and it is preferable that the elements are ITO films.

Furthermore, at least one of the first transparent electrode patterns 3 or the second transparent electrode patterns 4 can be installed in the regions on both the non-contact surface of the transparent substrate 1 and the surface of the mask layer 2 on the reverse side of the transparent substrate 1. It is preferable that the second transparent electrode patterns are installed in the regions on both the non-contact surface of the transparent substrate 1 and the surface of the mask layer 2 on the reverse side of the transparent substrate 1. As such, even in a case in which a photosensitive film is laminated over the mask layer, which needs to have a certain thickness, and the back surface of the transparent substrate, when a photosensitive film having the particular layer configuration that will be described below is used, even though expensive facilities such as a vacuum laminator is not used, lamination can be achieved through a simple process, without the occurrence of air bubbles at the boundaries of the mask portion.

The first transparent electrode patterns 3 and the second transparent electrode patterns 4 will be explained using FIG. 3. FIG. 3 is an explanatory diagram illustrating an example of the first transparent electrode patterns and the second transparent electrode patterns according to the invention. As illustrated in FIG. 3, the first transparent electrode patterns 3 are formed by pad portions 3a extending in a first direction through connection parts 3b. Furthermore, the second transparent electrode patterns 4 are electrically insulated from the first transparent electrode pattern 3 by means of the insulating layer 5, and are composed of plural pad portions that are formed by extending in a direction that perpendicularly intersects the first direction (second direction in FIG. 3). Here, in the case of forming the first transparent electrode patterns 3, the pad portions 3a and the connection parts 3b may be produced as integrated bodies, or only the connection parts 3b are produced, and the pad portions 3a and the second transparent electrode patterns 4 may be produced (patterned) as integrated bodies. In a case in which the pad portions 3a and the second transparent electrode patterns 4 are produced (patterned) as integrated bodies, as illustrated in FIG. 3, various layers are formed such that portions of the connection parts 3b and portions of the pad portions 3a are connected, and the first transparent electrode patterns 3 and the second transparent electrode patterns 4 are electrically insulated by the insulating layer 5.

Furthermore, the region in which the first transparent electrode patterns 3, the second transparent electrode patterns 4, or the conductive element 6 that will be described below are not formed in FIG. 3, corresponds to the non-patterned region 22 in the transparent laminate of the invention.

It is preferable that the other conductive element 6 is installed on the surface of the mask layer 2 on the reverse side of the transparent substrate 1. The other conductive element 6 is electrically connected to at least one of the first transparent electrode patterns 3 or the second transparent electrode patterns 4, and is an element different from the first transparent electrode patterns 3 and the second transparent electrode patterns 4.

Furthermore, it is preferable that the first curable transparent resin layer 7 is installed so as to cover the entirety of the various constituent elements. The first curable transparent resin layer 7 may be configured to cover only a portion of the various constituent elements. The insulating layer 5 and the first curable transparent resin layer 7 may be formed from the same material, or may be formed from different materials. Regarding the material that constitutes the insulating layer 5, those mentioned as the material for the first or second curable transparent resin layer in the transparent laminate of the invention can be preferably used.

<Method for Producing Capacitance-type Input Device>

Figure 4:
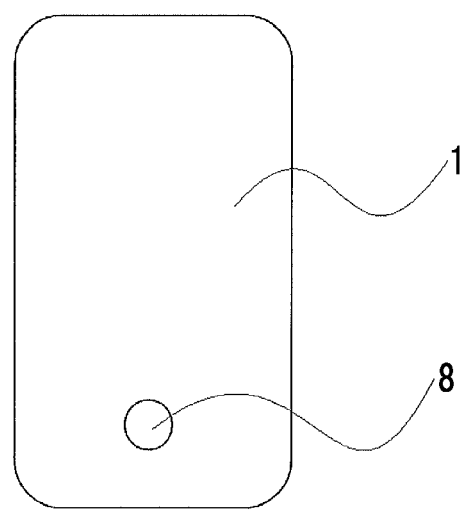
FIG. 4 is a top view illustrating an example of a transparent substrate having an opening formed therein.
Figure 5:
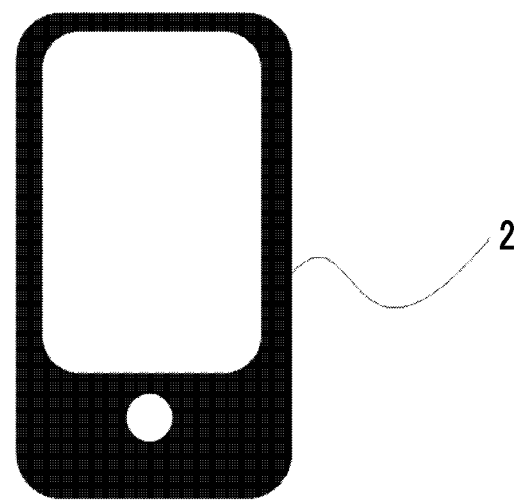
FIG. 5 is a top view illustrating an example of a transparent laminate having a mask layer formed thereon.
Figure 6:
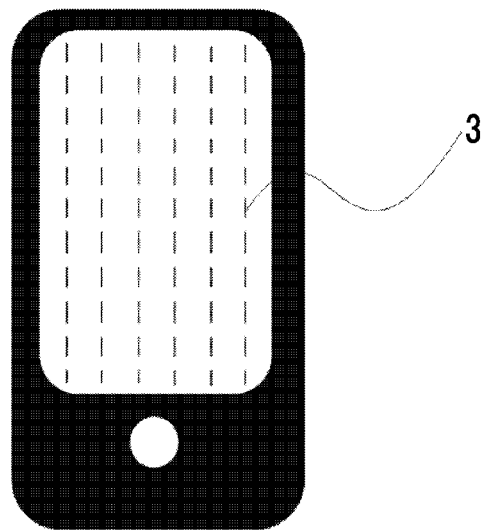
FIG. 6 is a top view illustrating an example of a transparent laminate having a first transparent electrode pattern formed thereon.
Figure 7:
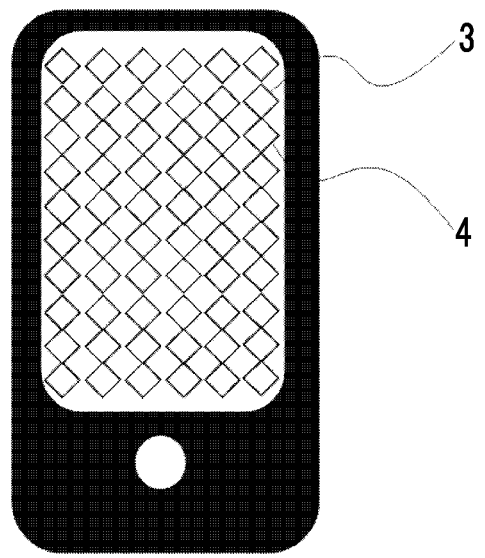
FIG. 7 is a top view illustrating an example of a transparent laminate having first and second transparent electrode patterns formed thereon.
Figure 8:
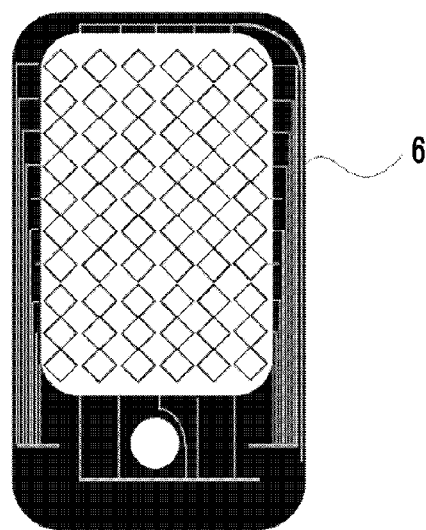
FIG. 8 is a top view illustrating an example of a transparent laminate on which a conductive element other than the first and second transparent electrode patterns is formed.

Examples of embodiments formed during the process for producing the capacitance-type input device of the invention include the embodiments shown in FIGS. 4 to 8. FIG. 4 is a top view illustrating an example of the transparent substrate 1 having an opening 8 formed thereon. FIG. 5 is a top view illustrating an example of a transparent substrate having a mask layer 2 formed thereon. FIG. 6 is a top view illustrating an example of a transparent substrate having a first transparent electrode pattern 3 formed thereon. FIG. 7 is a top view illustrating an example of a transparent substrate having first transparent electrode pattern 3 and second transparent electrode pattern 4 formed thereon. FIG. 8 is a top view illustrating an example of a transparent substrate on which a conductive element 6 different from the first and second transparent electrode patterns is formed. These illustrate examples that specifically embody the following descriptions, and the scope of the invention is not intended to be interpreted limitedly to these drawings.

In regard to the method for producing a capacitance-type input device, in a case in which the second curable transparent resin layer 12 and the first curable transparent resin layer 7 are formed, the second curable transparent resin layer 12 and the first curable transparent resin layer 7 can be formed by transferring the second curable transparent resin layer and the first curable transparent resin layer onto the surface of the transparent substrate 1 on which various elements have been arbitrarily formed, using the transfer film of the invention.

In regard to the method for producing a capacitance-type input device, it is preferable that at least one element of the mask layer 2, the first transparent electrode pattern 3, the second transparent electrode pattern 4, the insulating layer 5, or the conductive element 6 is formed using a photosensitive film having a temporary support and a photocurable resin layer in this order.

When various elements are formed using the transfer film of the invention or a photosensitive film, even in the transparent substrate having an opening, leakage of resist components through the opening part does not occur, and extrusion of resist components through the glass edge at the mask layer, for which it is necessary to form a light shielding pattern up to the border limit of the transparent substrate, does not occur. Therefore, manufacture of a touch panel having the advantages of being a thin layer and being lightweight is enabled by a simple process, without contaminating the backside of the substrate.

On the occasion of using a mask layer, an insulating layer, and a conductive photocurable resin layer, in a case in which permanent materials such as the first transparent electrode pattern, the second transparent electrode pattern, and the conductive element are formed using a photosensitive film, the photosensitive film is laminated on an arbitrary member to be transferred, and then is exposed patternwise as necessary. Then, a pattern can be obtained by eliminating the unexposed parts in the case of a negative type material, and eliminating the exposed parts in the case of a positive type material, through a developing treatment. Regarding the developing, the thermoplastic resin layer and the photocurable resin layer may be developed and removed with different liquids, or may be removed with the same liquid. If necessary, a known developing facility such as a brush or a high-pressure jet may be used in combination. After the developing, if necessary, post-exposure and post-bake may be implemented.

(Photosensitive Film)

The photosensitive film other than the transfer film of the invention, which is preferably used in the case of manufacturing the capacitance-type input device of the invention, will be explained. The photosensitive film has a temporary support and a photocurable resin layer, and it is preferable that the photosensitive film has a thermoplastic resin layer between the temporary support and the photocurable resin layer. When a mask layer and the like are formed using a photosensitive film having a thermoplastic resin layer, air bubbles are not easily generated in the element formed by transferring a photocurable resin layer, image unevenness or the like does not easily occur in the image display device, and excellent display characteristics can be obtained.

The photosensitive film may be formed from a negative type material, or may be formed from a positive type material.

—Layers Other Than Photocurable Resin Layer and Method for Preparing the Layers—

Regarding the temporary support for the photosensitive film, a temporary support similar to that used for the transfer film of the invention can be used. Regarding the thermoplastic resin layer used for the photosensitive film, those described in paragraphs [0056] to [0060] of JP2014-10814A can be used. Meanwhile, a known intermediate layer or an oxygen blocking layer may also be used together with the thermoplastic resin layer. Also, regarding the method for producing a photosensitive film, a method similar to the method for producing a transfer film of the invention can be used.

—Photocurable Resin Layer—

In the photosensitive film, additives are added to the photocurable resin layer according to the applications. That is, in the case of using the photosensitive film for the formation of a mask layer, a colorant is incorporated into the photocurable resin layer. Furthermore, in a case in which the photosensitive film has a conductive photocurable resin layer, conductive fibers and the like are incorporated into the photocurable resin layer.

In a case in which the photosensitive film is formed from a negative type material, it is preferable that the photocurable resin layer includes an alkali-soluble resin, a polymerizable compound, and a polymerization initiator or a polymerization initiator system. Furthermore, conductive fibers, a colorant, other additives, and the like are used, but the invention is not intended to be limited to these.

—Alkali-soluble Resin, Polymerizable Compound, and Polymerization Initiator or Polymerization Initiator System—

Regarding the alkali-soluble resin, the polymerizable compound, and the polymerization initiator or polymerization initiator system included in the photosensitive film, components similar to those used for the transfer film of the invention can be used.

—Conductive Fibers (In Case of Using as Conductive Photocurable Resin Layer)—

In a case in which a photosensitive film having a conductive photocurable resin layer laminated thereon is used for the formation of a transparent electrode pattern or another conductive element, the following conductive fibers and the like can be used in the photocurable resin layer.

The structure of the conductive fibers is not particularly limited, and can be appropriately selected according to the purpose. However, any one of a solid structure and a hollow structure is preferred.

Here, a fiber having a solid structure may be referred to as "wire", and a fiber having a hollow structure may be referred to as "tube". Furthermore, a conductive fiber having an average minor axis length of 5 nm to 1,000 nm and an average major axis length of 1 µm to 100 µm may be referred to as "nanowire".

Furthermore, a conductive fiber having an average minor axis length of 1 nm to 1,000 nm and an average major axis length of 0.1 µm to 1,000 µm and having a hollow structure, may be referred to as "nanotube".

The material for the conductive fiber is not particularly limited as long as the material is electrically conductive, and the material can be appropriately selected according to the purpose. However, at least one of metal or carbon is preferred, and among them, the conductive fiber is particularly preferably at least one of a metal nanowire, a metal nanotube, or a carbon nanotube.

The material for the metal nanowire is not particularly limited, and for example, at least one kind of metal selected from the group consisting of the elements of Period 4, Period 5 or Period 6 of the long-form Periodic Table (IUPAC 1991) is preferred; at least one kind of metal selected from among Group 2 to Group 14 is more preferred; and at least one kind of metal selected from among Group 2, Group 8, Group 9, Group 10, Group 11, Group 12, Group 13, or Group 14 is even more preferred. It is particularly preferable that the metal nanowire includes the metal as a main component.

Examples of the metal include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, and alloys thereof. Among these, from the viewpoint of having excellent conductivity, it is preferable that the metal nanowire mainly contains silver, or contains an alloy of silver and a metal other than silver.

When it is said that the metal nanowire mainly contains silver, it means that silver is included at a proportion of 50% by mass or more, and preferably 90% by mass or more, in the metal nanowire.

Examples of the metal used in the alloy with silver include platinum, osmium, palladium, and iridium. These may be used singly or in combination of two or more kinds thereof.

The shape of the metal nanowire is not particularly limited, and can be appropriately selected according to the purpose. For example, an arbitrary shape such as a cylindrical shape, a rectangular parallelopiped shape, or a pillar shape having a polygonal cross-section, can be adopted; however, for the applications in which high transparency is needed, a cylindrical shape or a cross-sectional shape in which the corners of the polygon of the cross-section are rounded is preferred.

The cross-sectional shape of the metal nanowire can be examined by applying an aqueous dispersion liquid of metal nanowires on an arbitrary substrate, and observing a cross-section with a transmission electron microscope (TEM).

Figure 9:
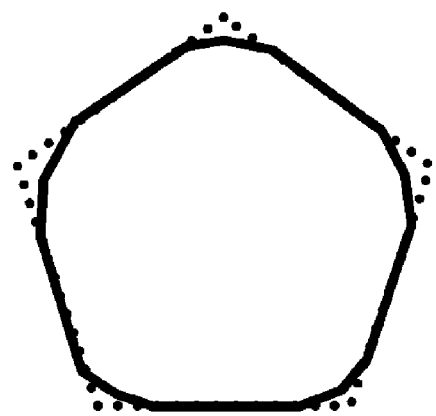
FIG. 9 is an explanatory diagram illustrating a cross-section of a metal nanowire.

A corner of a cross-section of the metal nanowire means the periphery of a point obtained by extending each side of the cross-section, and causing the side to intersect with a perpendicular line dropped from an adjoining side. Furthermore, "each side of the cross-section" is designated as a straight line connecting a corner with an adjoining corner. In this case, the proportion of the "outer circumferential length of the cross-section" with respect to the total length of the "each side of the cross-section" is designated as the degree of sharpness. Regarding the degree of sharpness, for example, in a metal nanowire cross-section such as shown in FIG. 9, the degree of sharpness can be represented by the proportion between the outer circumferential length of the cross-section indicated with solid lines and the outer circumferential length of the pentagon indicated with dotted lines. A cross-sectional shape having this degree of sharpness of 75% or less is defined as a cross-sectional shape with round corners. A degree of sharpness of 60% or less is preferred, and a degree of sharpness of 50% or less is more preferred. If the degree of sharpness exceeds 75%, electrons are localized at the corners, and plasmon absorption is increased, or a yellowish tinge remains, which may cause deterioration of transparency. Furthermore, linearity of the edges of the pattern is decreased, and rattling may occur. The lower limit of the degree of sharpness is preferably 30%, and more preferably 40%.

The average minor axis length (also referred to as "average minor axis diameter" or "average diameter") of the metal nanowire is preferably 150 nm or less, more preferably 1 nm to 40 nm, even more preferably 10 nm to 40 nm, and particularly preferably 15 nm to 35 nm.

If the average minor axis length is less than 1 nm, oxidation resistance is deteriorated, and durability may be deteriorated. If the average minor axis length is more than 150 nm, scattering attributable to the metal nanowire occurs, and sufficient transparency may not be obtained.

Regarding the average minor axis length of the metal nanowire, 300 metal nanowires were observed using a transmission electron microscope (TEM; manufactured by JEOL, Ltd., JEM-2000FX), and the average minor axis length of the metal nanowires was determined from the average value thereof. Meanwhile, regarding the minor axis length in the case in which the minor axis of the metal nanowire was not circular, the largest length was designated as the minor axis length.

The average major axis length (may be referred to as "average length") of the metal nanowire is preferably 1 µm to 40 µm, more preferably 3 µm to 35 µm, and even more preferably 5 µm to 30 µm.

If the average major axis length is less than 1 µm, it is difficult for the metal nanowires to form a compact network, and sufficient conductivity may not be obtained. If the average major axis length is more than 40 µm, the metal nanowires become too long and get entangled at the time of production, and aggregates may be produced during the production process.

Regarding the average major axis length of the metal nanowire, for example, 300 metal nanowires were observed using a transmission electron microscope (TEM; manufactured by JEOL, Ltd., JEM-2000FX), and the average major axis length of the metal nanowire was determined from the average value thereof. Meanwhile, in a case in which a metal nanowire was bent, a circle including the bent nanowire as an arc was considered, and the value calculated from the radius of the circle and the curvature was designated as the major axis length.

The layer thickness of the conductive photocurable resin layer is preferably 0.1 µm to 20 µm, more preferably 0.5 µm to 18 µm, and particularly preferably 1 µm to 15 µm, from the viewpoint of process suitability, such as the stability of the coating liquid, drying at the time of coating, and the developing time at the time of patterning. The content of the conductive fibers relative to the total solid content of the conductive photocurable resin layer is preferably 0.01% by mass to 50% by mass, more preferably 0.05% by mass to 30% by mass, and particularly preferably 0.1% by mass to 20% by mass, from the viewpoints of conductivity and the stability of the coating liquid.

—Colorant (In Case of Using as Mask Layer)—

Furthermore, in a case in which the photosensitive film is used as a mask layer, a colorant can be used for the photocurable resin layer. Regarding the colorant that is used for the invention, known colorants (organic pigments, inorganic pigments, dyes, and the like) can be suitably used. Furthermore, according to the invention, in addition to a black colorant, a mixture of pigments of red, blue, green and the like can be used.

In a case in which the photocurable resin layer is used as a black mask layer, from the viewpoint of the optical density, it is preferable that the photocurable resin layer includes a black colorant. Examples of the black colorant include carbon black, titanium carbon, iron oxide, titanium oxide, and graphite, and among them, carbon black is preferred.

In a case in which the photocurable resin layer is used as a white mask layer, the white pigments described in paragraph [0015] or [0114] of JP2005-7765A can be used. In order to use the photocurable resin layer as a mask layer having another color, mixtures of the pigments described in paragraphs [0183] to [0185] of JP4546276B, or mixtures of dyes may be used. Specifically, the pigments and dyes described in paragraphs [0038] to [0054] of JP2005-

17716A; the pigments described in paragraphs [0068] to [0072] of JP2004-361447A; the colorants described in paragraphs [0080] to [0088] of JP2005-17521A; and the like can be suitably used.

It is preferable that the colorant (preferably a pigment, and more preferably carbon black) is used as a dispersion liquid. This dispersion liquid can be prepared by adding a composition that is obtainable by mixing in advance a colorant and a pigment dispersant, to the organic solvent (or vehicle) that will be described below, and dispersing the composition therein. A vehicle means the portion of a medium in which a pigment is dispersed, when a coating material is in a liquid state. The vehicle includes a component (binder) that is liquid and binds with a pigment to form a coating film, and a component (organic solvent) that dissolves and dilutes the aforementioned component.

The dispersing machine that is used at the time of dispersing the pigment is not particularly limited, and examples thereof include known dispersing machines such as the kneader, roll mill, attriter, SUPERMILL, DISSOLVER, HOMOMIXER, and SANDMILL, which are described in Asakura Kunizo, "Ganryo no Jiten (Dictionary of Pigments)", $1^{st}$ Edition, Asakura Publishing Co., Ltd., 2000, p. 438. Furthermore, the pigment may also be finely pulverized by utilizing frictional force, by means of the mechanical attrition described in page 310 of this document.

Regarding the colorant, from the viewpoint of dispersion stability, a colorant having a number average particle size of 0.001 µm to 0.1 µm is preferred, and a colorant having a number average particle size of 0.01 µm to 0.08 µm is more preferred. Furthermore, the "particle size" as used herein refers to the diameter obtained when an electron microscopic photograph image of a particle is considered as a circle having the same area, and the "number average particle size" refers to the average value of 100 particle sizes obtained by determining the particle sizes of a large number of particles.

The layer thickness of the photocurable resin layer including a colorant is preferably 0.5 µm to 10 µm, more preferably 0.8 µm to 5 µm, and particularly preferably 1 µm to 3 µm, from the viewpoint of the thickness difference between the resin layer and other layers. The content of the colorant in the solid content of the colored photosensitive resin composition is not particularly limited; however, from the viewpoint of sufficiently shortening the developing time, the content is preferably 15% by mass to 70% by mass, more preferably 20% by mass to 60% by mass, and even more preferably 25% by mass to 50% by mass.

The total solid content as used in the present specification means the total mass of nonvolatile components excluding solvents and the like from the colored photosensitive resin composition.

Furthermore, in the case of forming an insulating layer using a photosensitive film, the layer thickness of the photocurable resin layer is preferably 0.1 µm to 5 µm, more preferably 0.3 µm to 3 µm, and particularly preferably 0.5 µm to 2 µm, form the viewpoint of maintaining insulation properties.

—Other Additives—

Furthermore, the photocurable resin layer may also use other additives. Regarding the additives, the same additives as those used for the transfer film of the invention can be used.

Furthermore, regarding the solvent at the time of producing a photosensitive film by coating, the same solvents as those used for the transfer film of the invention can be used.

Furthermore, the case in which the photosensitive film is formed from a negative type material has been mainly explained; however, the photosensitive film may be formed from a positive type material. In a case in which the photosensitive film is a positive type material, for example, the materials described in JP2005-221726A and the like are used in the photocurable resin layer; however, the invention is not intended to be limited thereto.

—Viscosities of Thermoplastic Resin Layer and Photocurable Resin Layer—

The viscosity of the thermoplastic resin layer measured at 100° C. is in the range of 1,000 Pa·sec to 10,000 Pa·sec, and the viscosity of the photocurable resin layer measured at 100° C. is in the range of 2,000 Pa·sec to 50,000 Pa·sec, and it is more preferable that the following Expression (A) is satisfied.

$$\text{Viscosity of thermoplastic resin layer} < \text{viscosity of photocurable resin layer} \quad \text{Expression (A):}$$

Here, the viscosity of each layer can be measured as follows. A measurement sample is provided by removing the solvent from a coating liquid for a thermoplastic resin layer or a photocurable resin layer by drying at the atmospheric pressure and under reduced pressure, and the viscosity is measured using, for example, VIBRON (Model DD-III; manufactured by Toyo Baldwin Co., Ltd.) as a measurement instrument, under the conditions of a measurement initiation temperature of 50° C., a measurement completion temperature of 150° C., a rate of temperature increase of 5° C./min, and a vibration frequency of 1 Hz/deg. Thus, the measured value at 100° C. can be used.

(Formation of Mask Layer and Insulating Layer Based on Photosensitive Film)

The mask layer 2 and the insulating layer 5 can be formed by transferring the photocurable resin layer onto a transparent substrate 1 or the like using a photosensitive film. For example, in the case of forming a black mask layer 2, the mask layer can be formed by using a photosensitive film having a black photocurable resin layer as a photocurable resin layer, and transferring the black photocurable resin layer onto the surface of a transparent substrate 1. In the case of forming the insulating layer 5, the insulating layer can be formed by using a photosensitive film having an insulating photocurable resin layer as the photocurable resin layer, and transferring the photocurable resin layer onto the surface of a transparent substrate 1 having a first transparent electrode pattern formed thereon.

Furthermore, when a photosensitive film having a particular layer configuration including a thermoplastic resin layer between a photocurable resin layer and a temporary support is used for the formation of a mask layer 2 which requires light shielding properties, air bubble generation at the time of photosensitive film lamination is prevented, and thus a high-quality mask layer 2 having no light leakage or the like can be formed.

(Formation of First and Second Transparent Electrode Pattern and Other Conductive Element Based on Photosensitive Film)

The first transparent electrode pattern 3, the second transparent electrode pattern 4, and the other conductive element 6 can be formed using an etching treatment or a photosensitive film having a conductive photocurable resin layer, or using a photosensitive film as a lift-off material.

—Etching Treatment—

In a case in which the first transparent electrode pattern 3, the second transparent electrode pattern 4, and the other conductive element 6 are formed by an etching treatment, first, a transparent electrode layer such as an ITO layer is formed by sputtering on the non-contact surface of a transparent substrate 1 having a mask layer 2 or the like formed thereon. Subsequently, an etching pattern is formed by exposure and developing, using a photosensitive film having a photocurable resin layer for etching as the photocurable resin layer on the transparent electrode layer. Thereafter, the transparent electrode layer is etched, thereby the transparent electrode is patterned, and by eliminating the etching pattern, a first transparent electrode pattern 3 or the like can be formed.

Even in a case in which a photosensitive film is used as an etching resist (etching pattern), a resist pattern can be obtained in the same manner as the method. Regarding the etching, etching and resist removal can be applied by the known method described in paragraphs [0048] to [0054] of JP2010-152155A.

For example, regarding the method for etching, a wet etching method of immersing in an etching liquid, which is generally practiced, may be used. Regarding the etching liquid used for wet etching, an etching liquid of an acidic type or an alkaline type may be appropriately selected in accordance with the object of etching. Examples of the etching liquid of acidic type include aqueous solutions of an acidic component alone, such as hydrochloric acid, sulfuric acid, hydrofluoric acid, or phosphoric acid; and mixed aqueous solutions of acidic components and salts such as ferric chloride, ammonium fluoride, and potassium permanganate. Regarding the acidic component, a combination of plural acidic components may also be used. Furthermore, examples of the etching liquid of alkaline type include aqueous solutions of alkali components alone, such as sodium hydroxide, potassium hydroxide, ammonia, organic amines, and salts of organic amines, such as tetramethylammonium hydroxide; and mixed aqueous solutions of alkali components and salts such as potassium permanganate. Regarding the alkali component, a combination of plural alkali components may also be used.

The temperature of the etching liquid is not particularly limited; however, the temperature is preferably 45° C. or lower. The resin pattern used as the etching mask (etching pattern) in the invention is a resin pattern formed using the photocurable resin layer described above, and exhibits especially excellent resistance to acidic and alkaline etching liquids in such a temperature range. Therefore, the resin pattern is prevented from being peeled during the etching step, and the parts where the resin pattern does not exist are selectively etched.

After etching, in order to prevent line contamination, a washing step and a drying step may be carried out as necessary. The washing step may be carried out by, for example, washing a transparent substrate having various layers formed thereon, using pure water at normal temperature for 10 seconds to 300 seconds. The drying step may be carried out using air blowing, and by appropriately adjusting the air blow pressure (about 0.1 kg/cm$^2$ to 5 kg/cm$^2$).

Subsequently, the method for peeling the resin pattern is not particularly limited; however, for example, a method by which a transparent substrate having various layers formed thereon is immersed for 5 minutes to 30 minutes in a peeling solution that is being stirred at 30° C. to 80° C., and preferably 50° C. to 80° C., may be used. The resin pattern used as an etching mask in the invention exhibits excellent chemical resistance at 45° C. or lower as explained above. However, when the chemical agent temperature rises to 50° C. or higher, the resin pattern exhibits a property of being swollen by an alkaline peeling solution. Due to such a property, when a peeling step is carried out using a peeling solution at 50° C. to 80° C., there is obtained an advantage that the duration of the process is shortened, and the peeling residue of the resin pattern is produced less. That is, by providing a difference in the chemical agent temperature between the etching step and the peeling step, the resin pattern used as the etching mask in the invention exhibits satisfactory chemical resistance in the etching step, and exhibits satisfactory peelability in the peeling step. Thus, contrasting characteristics such as chemical resistance and peelability can be both satisfied.

Examples of the peeling solution include solutions obtained by dissolving an inorganic alkali component such as sodium hydroxide or potassium hydroxide, or an organic alkali component such as a tertiary amine or a quaternary ammonium salt, in water, dimethyl sulfoxide, N-methylpyrrolidone, or a mixed solution thereof. Peeling may be carried out by spraying, showering, paddling or the like, using such a peeling solution.

—Photosensitive Film Having Conductive Photocurable Resin Layer—

In a case in which the first transparent electrode pattern 3, the second transparent electrode pattern 4, or the other conductive element 6 is formed using a photosensitive film having a conductive photocurable resin layer, such a pattern can be formed by transferring the conductive photocurable resin layer onto the surface of the transparent substrate 1.

When the first transparent electrode pattern 3 or the like is formed using a photosensitive film having a conductive photocurable resin layer, even in a transparent substrate having an opening, leakage of resist components through the opening part does not occur, and manufacture of a touch panel having advantages of being a thin layer and being lightweight is enabled by a simple process, without contaminating the backside of the substrate.

Furthermore, when a photosensitive film having a particular layer configuration having a thermoplastic resin layer between a conductive photocurable resin layer and a temporary support is used for the formation of the first transparent electrode pattern 3 or the like, bubble generation at the time of lamination of the photosensitive film is prevented, and a first transparent electrode pattern 3, a second transparent electrode pattern 4, or another conductive element 6, all of which have excellent conductivity and low resistance, can be formed.

—Use of Photosensitive Film as Lift-off Material—

Furthermore, a first transparent electrode layer, a second transparent electrode layer, or another conductive member can also be formed using the photosensitive film as a lift-off material. In this case, patterning is performed using the photosensitive film, subsequently a transparent conductive layer is formed over the entire surface of a transparent substrate having various layers formed thereon, and then dissolution and removal of the photocurable resin layer together with the deposited transparent conductive layer is carried out. Thereby, a desired transparent conductive layer pattern can be obtained (lift-off method).

[Image Display Device]

The image display device of the invention comprises the capacitance-type input device of the invention.

In regard to the capacitance-type input device of the invention and an image display device comprising this capacitance-type input device as a constituent element, the configurations disclosed in "Saishin Tatchipaneru Gijutsu (Latest Touch Panel Technologies)" (published by Techno Times Co., Ltd., on Jul. 6, 2009); Mitani, Yuji, reviewed, "Tatchipaneru no Gijutsui to Kaihatsu (Technology and Development of Touch Panels)", published by CMC Publishing Co., Ltd. (December, 2004); FPD International 2009 Forum T-11, Lecture textbook; and Cypress Semiconductor Corporation Application Note AN2292; and the like can be applied.

EXAMPLES

Hereinafter, the invention will be more specifically described by way of Examples. The materials, the use amounts, proportions, details of treatments, treatment procedures, and the like described in the following Examples can be appropriately altered, unless the gist of the invention is maintained. Therefore, the scope of the invention is not intended to the specific examples described below. Meanwhile, unless particularly stated otherwise, the units "parts" and "percent (%)" are on a mass basis.

Examples 1 to 7 and 10 to 14, and Comparative Examples 1 and 2

<1. Formation of Transparent Film>

A cycloolefin resin film having a film thickness of 100 μm and a refractive index of 1.53 was subjected to surface modification by performing a corona discharge treatment for 3 seconds using a high-frequency oscillator at an output voltage of 100% and an output power of 250 W with a wire electrode having a diameter of 1.2 mm, under the conditions of an electrode length of 240 mm and a working electrode interval of 1.5 mm. The film thus obtained was used as a transparent film substrate.

Next, the material of Material-3 indicated in the following Table 1 was applied on the transparent film substrate using a slit-shaped nozzle, and then the material was irradiated with ultraviolet radiation (cumulative amount of light: 300 mJ/cm$^2$) and was dried at about 110° C. Thereby, a transparent film having a refractive index of 1.60 and a film thickness of 80 nm was produced.

Meanwhile, in the following Table 1 and the following Formula (1), "percent (%)" and "wt %" both represent percent (%) by mass.

$ZrO_2$: It is known that the pigment concentration of ZR-010 (zirconium oxide dispersion liquid, trade name: NANON5 ZR-010) manufactured by Solar Co., Ltd. is 30% by mass, and for example, the product is described in the catalogue related to NANON5 ZR-010 of Solar Co., Ltd. (Kitamura Chemicals Co., Ltd., No. 1202033, published in February 2012).

Furthermore, the amount of metal oxide particles relative to the solid content in each material, that is, the amount of metal oxide particles after film formation, is calculated as follows: 28.1% by mass for Material-3, 37.9% by mass for Material-4, 43.9% by mass for Material-5, 57.0% by mass for Material-6, 59.9% by mass for Material-7, 65.8% by mass for Material-8, 72.4% by mass for Material-9, and 25.1% by mass for Material-10.

TABLE 1

| Material | Material-1 | Material-2 | Material-11 | Material-3 | Material-4 | Material-5 |
|---|---|---|---|---|---|---|
| $ZrO_2$: ZR-010 manufactured by Solar Co., Ltd. (pigment concentration 30%) | 0 | 0 | 0 | 2.08 | 2.82 | 3.27 |
| DPHA liquid (dipentaerythritol hexaacrylate: 38%, dipentaerythritol pentaacrylate: 38%, 1-methoxy-2-propyl acetate: 24%) | 0.76 | 0.76 | 0.76 | 0.29 | 0.25 | 0.22 |
| Urethane-based monomer: UK OLIGO UA-32P manufactured by Shin-Nakamura Chemical Co., Ltd.; nonvolatile components 75%, 1-methoxy-2-propyl acetate: 25% | 0.36 | 0.36 | 0.36 | 0.14 | 0.12 | 0.11 |
| Monomer mixture (polymerizable compound (b2-1) described in paragraph [0111] of JP2012-78528A, n = 1: tripentaerythritol octaacrylate content: 85%, total amount of n = 2 and n = 3 as impurities is 15%) | 0.96 | 0.96 | 0.96 | 0.36 | 0.31 | 0.28 |
| Polymer solution 1 (structural formula P-25 described in paragraph [0058] of JP2008-146018A: weight average molecular weight = 35,000, solid content 45%, 1-methoxy-2-propyl acetate 15%, 1-methoxy-2-propanol 40%) | 6.69 | 6.69 | 6.69 | 1.89 | 1.63 | 1.47 |
| Photoradical polymerization initiator: 2-benzyl-2-dimethylamino-1-(4-morpholinophenyl)-butanone (IRGACURE 379, manufactured by BASF SE) | 0.09 | 0.18 | 0.27 | 0.03 | 0.03 | 0.03 |
| Photopolymerization initiator: KAYACURE DETX-S (alkylthioxanthone manufactured by Nippon Kayaku Co., Ltd.) | 0.09 | 0.18 | 0.27 | 0.03 | 0.03 | 0.03 |
| Polymer solution 2 (compound represented by following Formula (1): weight average molecular weight 15,000, nonvolatile components 30 wt %, methyl ethyl ketone 70 wt %) | 0.03 | 0.03 | 0.03 | 0.01 | 0.01 | 0.01 |
| 1-Methoxy-2-propyl acetate | 52.99 | 52.81 | 52.63 | 38.73 | 38.78 | 38.81 |
| Methyl ethyl ketone | 38.04 | 38.04 | 38.04 | 56.8 | 56.28 | 55.96 |
| Content of metal oxide fine particles [% by mass] | 0.0 | 0.0 | 0.0 | 28.1 | 37.9 | 43.9 |
| Total (parts by mass) | 100 | 100 | 100 | 100 | 100 | 100 |

| Material | Material-6 | Material-7 | Material-8 | Material-9 | Material-10 |
|---|---|---|---|---|---|
| $ZrO_2$: ZR-010 manufactured by Solar Co., Ltd. (pigment concentration 30%) | 4.24 | 4.46 | 4.91 | 5.35 | 1.86 |
| DPHA liquid (dipentaerythritol hexaacrylate: 38%, dipentaerythritol pentaacrylate: 38%, 1-methoxy-2-propyl acetate: 24%) | 0.17 | 0.16 | 0.14 | 0.11 | 0.3 |
| Urethane-based monomer: UK OLIGO UA-32P manufactured by Shin-Nakamura Chemical Co., Ltd.; nonvolatile components 75%, 1-methoxy-2-propyl acetate: 25% | 0.08 | 0.08 | 0.06 | 0.05 | 0.14 |

TABLE 1-continued

| | | | | | |
|---|---|---|---|---|---|
| Monomer mixture (polymerizable compound (b2-1) described in paragraph [0111] of JP2012-78528A, n = 1: tripentaerythritol octaacrylate content: 85%, total amount of n = 2 and n = 3 as impurities is 15%) | 0.22 | 0.2 | 0.17 | 0.14 | 0.38 |
| Polymer solution 1 (structural formula P-25 described in paragraph [0058] of JP2008-146018A: weight average molecular weight = 35,000, solid content 45%, 1-methoxy-2-propyl acetate 15%, 1-methoxy-2-propanol 40%) | 1.13 | 1.05 | 0.89 | 0.73 | 1.97 |
| Photoradical polymerization initiator: 2-benzyl-2-dimethylamino-1-(4-morpholinophenyl)-butanone (IRGACURE 379, manufactured by BASF SE) | 0.02 | 0.02 | 0.02 | 0.01 | 0.03 |
| Photopolymerization initiator: KAYACURE DETX-S (alkylthioxanthone manufactured by Nippon Kayaku Co., Ltd.) | 0.02 | 0.02 | 0.02 | 0.01 | 0.03 |
| Polymer solution 2 (compound represented by following Formula (1): weight average molecular weight 15,000, nonvolatile components 30 wt %, methyl ethyl ketone 70 wt %) | 0.01 | 0.01 | 0.01 | 0.01 | 0.01 |
| 1-Methoxy-2-propyl acetate | 38.88 | 39.9 | 38.93 | 38.96 | 38.71 |
| Methyl ethyl ketone | 55.29 | 55.13 | 54.82 | 54.51 | 56.95 |
| Content of metal oxide fine particles [% by mass] | 57.0 | 59.9 | 65.8 | 72.4 | 25.1 |
| Total (parts by mass) | 100 | 100 | 100 | 100 | 100 |

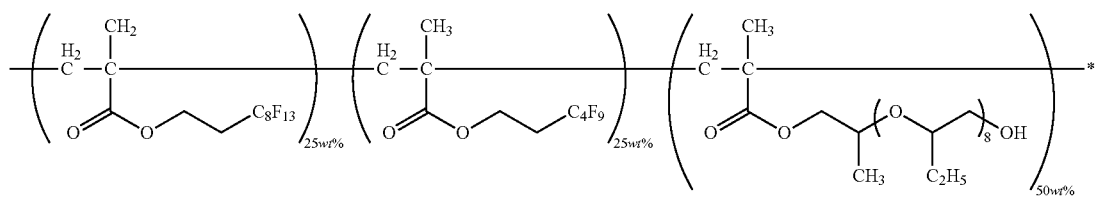

Formula (1)

Mw 15000

<2. Formation of Transparent Electrode Pattern>

The film having a transparent film laminated on a transparent film substrate, which was obtained as described above, was introduced into a vacuum chamber, and an ITO thin film having a thickness of 40 nm and a refractive index of 1.82 was formed by DC magnetron sputtering (conditions: temperature of transparent film substrate: 150° C., argon pressure: 0.13 Pa, and oxygen pressure: 0.01 Pa) using an ITO target having a $SnO_2$ content of 10% by mass (indium:tin=95:5 (molar ratio)). Thus, a film having a transparent film and a transparent electrode layer formed on a transparent film substrate was obtained. The surface resistance of the ITO thin film was 80Ω/□ (Ω per □).

(Production of Photosensitive Film for Etching E1)

On a polyethylene terephthalate film temporary support having a thickness of 75 μm, a coating liquid for a thermoplastic resin layer formed from Formulation H1 described below was applied using a slit-shaped nozzle, and the coating liquid was dried. Next, a coating liquid for an intermediate layer formed from Formulation P1 described below was applied and dried. Furthermore, a coating liquid for a photocurable resin layer for etching formed from Formulation E1 described below was applied and dried. In this manner, a laminate having a thermoplastic resin layer having a dried film thickness of 15.1 μm, an intermediate layer having a dried film thickness of 1.6 μm, and a photocurable resin layer for etching having a film thickness of 2.0 μm on a temporary support, was obtained, and lastly, a protective film (polypropylene film having a thickness of 12 μm) was compressed thereon. Thus, a transfer material in which a temporary support, a thermoplastic resin layer, an intermediate layer (oxygen blocking film), and a transparent curable resin layer were integrated was produced.

(Coating Liquid for Photocurable Resin Layer for Etching: Formulation E1)

| | |
|---|---|
| Methyl methacrylate/styrene/methacrylic acid copolymer (copolymer composition (mass %): 31/40/29, mass average molecular weight: 60,000, acid value: 163 mg KOH/g): | 16 parts by mass |
| Monomer-1 (trade name: BPE-500, manufactured by Shin Nakamura Chemical Co., Ltd.): | 5.6 parts by mass |
| Tetraethylene oxide monomethacrylate 0.5 mol adduct of hexamethylene diisocyanate: | 7 parts by mass |
| Cyclohexanedimethanol monoacrylate as a compound having one polymerizable group in the molecule: | 2.8 parts by mass |
| 2-Chloro-N-butylacridone: | 0.42 parts by mass |
| 2,2-bis(o-chlorophenyl)-4,4',5,5'-tetraphenylbiimidazole: | 2.17 parts by mass |
| Malachite Green oxalate: | 0.02 parts by mass |
| Leuco Crystal Violet: | 0.26 parts by mass |
| Phenothiazine: | 0.013 parts by mass |
| Surfactant (trade name: MEGAFAC F-780F, manufactured by Dainippon Ink and Chemicals, Inc.): | 0.03 parts by mass |
| Methyl ethyl ketone: | 40 parts by mass |
| 1-Methoxy-2-propanol: | 20 parts by mass |

Meanwhile, the viscosity at 100° C. of the coating liquid E1 for a photocurable resin layer for etching after solvent removal was 2,500 Pa·sec.

(Coating Liquid for Thermoplastic Resin Layer: Formulation H1)

| | |
|---|---|
| Methanol: | 11.1 parts by mass |
| Propylene glycol monomethyl ether acetate: | 6.36 parts by mass |
| Methyl ethyl ketone: | 52.4 parts by mass |
| Methyl methacrylate/2-ethylhexyl acrylate/benzyl methacrylate/methacrylic acid copolymer (copolymerization composition ratio (molar ratio) = 55/11.7/4.5/28.8, molecular weight = 100,000, Tg ≈ 70° C.): | 5.83 parts by mass |
| Styrene/acrylic acid copolymer (copolymerization composition ratio (molar ratio) = 63/37, weight average molecular weight = 10,000, Tg ≈ 100° C.): | 13.6 parts by mass |
| Monomer-1 (trade name: BPE-500, manufactured by Shin Nakamura Chemical Co., Ltd.): | 9.1 parts by mass |
| Fluorine-based polymer: | 0.54 parts by mass |

The fluorine-based polymer described above is a copolymer of 40 parts of $C_6F_{13}CH_2CH_2OCOCH=CH_2$, 55 parts of $H(OCH(CH_3)CH_2)_7OCOCH=CH_2$, and 5 parts of $H(OCHCH_2)_7OCOCH=CH_2$ having a weight average molecular weight of 30,000, and is in the form of a 30 mass % solution in methyl ethyl ketone (trade name: MEGAFAC F780F, manufactured by Dainippon Ink and Chemicals, Inc.).

(Coating Liquid for Intermediate Layer: Formulation P1)

| | |
|---|---|
| Polyvinyl alcohol: | 32.2 parts by mass |

(trade name: PVA205, manufactured by Kuraray Co., Ltd., degree of saponification: 88%, degree of polymerization: 550)

| | |
|---|---|
| Polyvinylpyrrolidone (trade name: K-30, manufactured by ISP Japan, Ltd.): | 14.9 parts by mass |
| Distilled water: | 524 parts by mass |
| Methanol: | 429 parts by mass |

(Formation of Transparent Electrode Pattern)

The film having a transparent film and a transparent electrode layer formed on a transparent film substrate was washed, and a photosensitive film for etching E1, from which a protective film had been removed, was laminated thereon (temperature of transparent film substrate: 130° C., rubber roller temperature: 120° C., linear pressure: 100 N/cm, and conveyance speed: 2.2 m/min). The temporary support was peeled off, and then the distance between the surface of an exposure mask (quartz exposure mask having a transparent electrode pattern) and this photocurable resin layer for etching was set to 200 μm, and patternwise exposure was performed at an amount of exposure of 50 mJ/cm² (i-line).

Next, the film was treated using a triethanolamine-based developer (containing 30% by mass of triethanolamine, a liquid obtained by diluting trade name: T-PD2 (manufactured by Fujifilm Corporation) 10 times with pure water) for 100 seconds at 25° C., and was treated using a surfactant-containing washing liquid (a liquid obtained by diluting trade name: T-SD3(manufactured by Fujifilm Corporation) 10 times with pure water) for 20 seconds at 33° C. Removal of residue was carried out using a rotating brush and an ultrahigh pressure washing nozzle, and the film was further subjected to a post-bake treatment at 130° C. for 30 minutes. Thus, a film having a transparent film, a transparent electrode layer, and a photocurable resin layer pattern for etching formed on a transparent film substrate was obtained.

The film having a transparent film, a transparent electrode layer, and a photocurable resin layer pattern for etching on a transparent film substrate, was immersed in an etching tank containing an ITO etchant (aqueous solution of hydrochloric acid and potassium chloride, liquid temperature: 30° C.), and the film was treated for 100 seconds. The transparent electrode layer in an exposed region that was not covered with the photocurable resin layer for etching was dissolved and removed, and thus a transparent electrode pattern-attached film attached with a pattern of a photocurable resin layer for etching was obtained.

Next, the transparent electrode pattern-attached film attached with a pattern of a photocurable resin layer for etching was immersed in a resist peeling tank containing a resist peeling solution (N-methyl-2-pyrrolidone, monoethanolamine, and a surfactant (trade name: SURFYNOL 465, manufactured by Air Products and Chemicals, Inc.), liquid temperature: 45° C.) and was treated for 200 seconds. The photocurable resin layer for etching was removed, and a film having a transparent film and a transparent electrode pattern formed on a transparent film substrate was obtained.

<3. Production of Transfer Films of Various Examples and Comparative Examples>

On a temporary support which was a polyethylene terephthalate film having a thickness of 50 μm, any one of Material-1, Material-2 and Material-11 for a first curable transparent resin layer prepared so as to have the compositions indicated in Table 1 was applied using a slit-shaped nozzle, while the amount of coating was varied, by regulating the coating so as to obtain the desired film thickness described in the following Table 2, and the material was dried. Thus, a first curable transparent resin layer was formed on the temporary support.

At the time point of having applied and dried the first curable transparent resin layer, slices were cut from this first curable transparent resin layer from the surface using a microtome. 2 mg of powdered KBr was added to 0.1 mg of these slices, and the resultant was thoroughly mixed under a yellow lamp. The mixture was used as a measurement sample for a UV-uncured article for the measurement of the double bond consumption rate that will be described below.

In each of Examples 1 to 7, 10 to 12 and 14, and Comparative Example 1, after the first curable transparent resin layer was produced, the resin layer was irradiated with UV lamp light (amount of exposure: 300 mJ/cm², metal halide lamp). However, in Example 13, irradiation with a UV lamp was not performed.

At the time point of having applied, dried, and cured the first curable transparent resin layer, slices were cut from this first curable transparent resin layer from the surface using a microtome. 2 mg of powdered KBr was added to 0.1 mg of these slices, and the resultant was thoroughly mixed under a yellow lamp. The mixture was used as a measurement sample after application, drying and curing for the measurement of the double bond consumption rate that will be described below.

(Measurement of Double Bond Consumption Rate)

The wavelength region from 400 cm$^{-1}$ to 4,000 cm$^{-1}$ was analyzed using an FT-IR apparatus (manufactured by Thermo Nicolet Japan, Inc., NICOLET 710), and the peak intensity of a peak at 810 cm$^{-1}$ originating from a C═C bond was determined. The peak intensity (=residual amount of double bonds) A of a UV-uncured article that had been applied and dried only, and the peak intensity B of various film slices after application, drying and curing were determined. For the first curable transparent resin layer formed in each of the Examples and Comparative Examples, the double bond consumption rate was calculated by the following expression.

Expression: Double bond consumption rate=$\{1-(B/A)\} \times 100\%$

<<Evaluation Criteria>>
A: The double bond consumption rate is 10% or higher.
B: The double bond consumption rate is less than 10%.
Meanwhile, the double bond consumption rate serves as an indicator for the degree of interfacial mixing between the first layer and the second layer.

(Formation of Second Curable Transparent Resin Layer)

Subsequently, any one of Material-3 to Material-10 for a second curable transparent resin layer prepared so as to obtain the compositions indicated in Table 1 was applied, while the amount of coating was varied, by regulating the coating so as to obtain the desired film thickness described in the following Table 2, and the material was dried. Thus, a second curable transparent resin layer was formed on the first curable transparent resin layer.

(Contact Bonding of Protective Film)

For the laminate having a first curable transparent resin layer and a second curable transparent resin layer provided on a temporary support, a protective film (a polypropylene film having a thickness of 12 µm) was lastly contact-bonded onto the second curable transparent resin layer.

As described above, a transfer film in which the temporary support, the first curable transparent resin layer, the second curable transparent resin layer, and the protective film were integrated, was produced. The transfer film thus obtained was used as the transfer film of each of the Examples and Comparative Examples.

<4. Production of Transparent Laminates of Various Examples and Comparative Examples>

Using the transfer film of each of Examples and Comparative Examples, from which the protective film was peeled off, the second transparent curable resin layer, the first transparent curable resin layer, and the temporary support were transferred in this order, such that the second transparent curable resin layer covered the transparent film and the transparent electrode pattern of the film having a transparent film and a transparent electrode pattern formed on a transparent film substrate (temperature of transparent film substrate: 40° C., rubber roller temperature: 110° C., linear pressure: 3 N/cm, and conveyance speed: 2 m/min).

Thereafter, the layers were exposed over the entire surface with i-line at 100 mJ/cm$^2$ through the temporary support side, using a proximity type exposure machine (manufactured by Hitachi High-Tech Electronics Engineering Co., Ltd.) having an ultrahigh pressure mercury lamp. Subsequently, the temporary support was peeled off from the first transparent curable resin layer.

Next, the film to which the first transparent curable resin layer and the second transparent curable resin layer had been transferred was subjected to a heating treatment (post-bake) for 30 minutes at 150° C., and thus a transparent laminate in which a transparent film, a transparent electrode pattern, a second transparent curable resin layer, and a first transparent curable resin layer were laminated on a transparent film substrate was obtained.

The transparent laminate thus obtained was used as the transparent laminate of each of the Examples and Comparative Examples.

Example 8

A transfer film of Example 8 was produced in the same manner as in the production of the transfer film of Example 1, except that the first curable transparent resin layer and the second curable transparent resin layer used in Example 1 were changed so as to have the kind and film thickness described in the following Table 2.

A transparent laminate of Example 8 was produced in the same manner as in the production of the transparent laminate of Example 1, except that the transfer film of Example 8 was used instead of the transfer film of Example 1 used in Example 1, and a triacetyl cellulose (TAC) resin film having a thickness of 100 µm and a refractive index of 1.49 was used instead of the cycloolefin resin film as the transparent film substrate.

Example 9

A transfer film of Example 9 was produced in the same manner as in the production of the transfer film of Example 1, except that the first curable transparent resin layer and the second curable transparent resin layer used in Example 1 were changed so as to have the kind and film thickness described in the following Table 2.

A transparent laminate of Example 9 was produced in the same manner as in the production of the transparent laminate of Example 1, except that the transfer film of Example 9 was used instead of the transfer film of Example 1 used in Example 1, and a polyethylene terephthalate resin film having a thickness of 100 µm and a refractive index of 1.6 was used instead of the cycloolefin resin film as the transparent film substrate.

Comparative Example 2

A transfer film of Comparative Example 2 was produced in the same manner as in Example 1, except that the second curable transparent resin layer used in Example 1 was not formed.

A transparent laminate of Comparative Example 2 was produced in the same manner as in the production of the transparent laminate of Example 1, except that the first transparent curable resin layer was transferred using the transfer film of Comparative Example 2, instead of the transfer film of Example 1 used in Example 1, such that the first transparent curable resin layer covered the transparent film and the transparent electrode pattern of the film having a transparent film and a transparent electrode pattern formed on a transparent film substrate.

Example 15

A transfer film of Example 15 was produced in the same manner as in the production of the transfer film of Example 1, except that the first curable transparent resin layer and the second curable transparent resin layer used in Example 1 were changed so as to have the kind and film thickness described in the following Table 2.

Both surfaces of the cycloolefin resin film used in Example 1 were subjected to surface modification in the same manner as in Example 1, and a transparent film was formed on the two surfaces in the same manner as in Example 1. Furthermore, a transparent electrode pattern was formed on the two surfaces of the film having a transparent film formed on a transparent film substrate, in the same manner as in Example 1.

The second curable transparent resin layer and the first curable transparent resin layer were transferred in the same manner as in Example 1, onto the transparent electrode pattern on one surface side of the film thus obtained, in which a transparent electrode pattern, a transparent film, a transparent film substrate, a transparent film, and a transparent electrode pattern were formed in this order, except that the transfer film of Example 15 was used instead of the transfer film of Example 1.

Subsequently, the second curable transparent resin layer and the first curable transparent resin layer were transferred in the same manner as in Example 1, onto the transparent electrode pattern on the other surface side of the film thus obtained, in which a transparent electrode pattern, a transparent film, a transparent film substrate, a transparent film, and a transparent electrode pattern were formed in this order, except that the transfer film of Example 15 was used instead of the transfer film of Example 1.

The transparent laminate obtained as such, in which a transparent film, a transparent electrode layer, a second curable transparent resin layer, and the first curable transparent resin layer were formed in this order symmetrically on both surfaces of a cycloolefin resin film used as a transparent film substrate, was used as the transparent laminate of Example 15.

Example 16

Both surfaces of a cycloolefin resin film were subjected to surface modification in the same manner as in Example 1, and hard coat layer-forming composition HC1 as described below was applied to a thickness of 1 μm on both surfaces of the film after surface modification. Subsequently, curing by ultraviolet irradiation was performed, and thus a hard coat layer was formed. The hard coat layer HC1 used as a transparent film had a refractive index of 1.80, and the content of metal oxide particles relative to the total solid content of the transparent film was 24.5% by mass.

(Hard Coat Layer-forming Composition HC1)

| | |
|---|---|
| UV-7640B (manufactured by Nippon Synthetic Chemical Industry Co., Ltd.) | 15 parts by mass |
| MIBK-SD (silica filler concentration: 30%, MIBK solvent) (manufactured by Nissan Chemical Industries, Ltd.) | 13 parts by mass |
| IRGACURE 184 (manufactured by BASF SE) | 1 part by mass |
| 1-Methoxy-2-propanol | 61 parts by mass |

The film having a hard coat layer formed on both surfaces of the transparent film substrate was introduced into a vacuum chamber, and IZO was sputtered at 150° C. onto the hard coat layers on both surfaces by DC magnetron sputtering (conditions: argon pressure: 0.13 Pa, oxygen pressure: 0.01 Pa), using an IZO target having a $ZnO_2$ content of 10% by mass (indium:zinc=95:5 (molar ratio)), and the film was further subjected to a heat treatment for 1 hour at 150° C. Thereby, transparent electrode layers having excellent crystallinity were formed. The transparent electrode layer thus obtained was an IZO thin film having a thickness of 60 nm and a refractive index of 1.91. The surface resistance of the IZO thin film was 22Ω/□.

Subsequently, the transparent electrode layer obtained in the same manner as in Example 1 was etched, and thereby a film in which an IZO transparent electrode pattern, a hard coat layer, a transparent film substrate, a hard coat layer, and an IZO transparent electrode pattern were formed in this order was obtained.

Next, a transfer film of Example 16 was produced in the same manner as in the production of the transfer film of Example 1, except that the first curable transparent resin layer and the second curable transparent resin layer used in Example 1 were changed so as to have the kind and film thickness described in the following Table 2. Meanwhile, Material-12 used for the second curable transparent resin layer was a composition as follows. Furthermore, the amount of metal oxide particles relative to the solid content in Material-12 that is, the amount of metal oxide particles after film formation, was calculated to be 38.8% by mass.

(Material-12)

| | |
|---|---|
| LDC-003 (rutile type titanium dioxide concentration: 20%, MEK solvent) (manufactured by Ishihara Sangyo Kaisha, Ltd.) | 3.6 parts by mass |
| DPHA liquid (dipentaerythritol hexaacrylate: 38%, dipentaerythritol pentaacrylate: 38%, 1-methoxy-2-propyl acetate: 24%) | 0.26 parts by mass |
| RP-1040 (EO-modified pentaerythritol tetraacrylate, manufactured by Nippon Kayaku Co., Ltd.) | 0.20 parts by mass |
| Polymer solution (Structural formula P-25 described in paragraph [0058] of JP2008-146018A: weight average molecular weight = 35,000, solid content: 45%, 1-methoxy-2-propyl acetate: 15%, 1-methoxy-2-propanol: 40%) | 1.10 parts by mass |
| IRGACURE OXE-01 (manufactured by BASF SE) | 0.02 parts by mass |
| POLYPHOSMER PP401 (manufactured by DAP Co., Ltd.) | 1.49 parts by mass |
| l-Methoxy-2-propyl acetate | 38.88 parts by mass |
| Methyl ethyl ketone | 54.50 parts by mass |

A transparent laminate of Example 16 was produced in the same manner as in Example 15, except that the transfer film of Example 16 was used instead of the transfer film of Example 15 used in Example 15, and a film in which an IZO transparent electrode pattern, a hard coat layer, a transparent film substrate, a hard coat layer, and an IZO transparent electrode pattern were formed in this order was used instead of the film in which a transparent electrode pattern, a transparent film, a transparent film substrate, a transparent film, and a transparent electrode pattern were formed in this order.

[Evaluation of Transparent Laminate]
<Evaluation of Visibility of Transparent Electrode Pattern>

A transparent laminate of each of the Examples and Comparative Examples, in which a transparent film, a transparent electrode pattern, a second curable transparent resin layer, and a first curable transparent resin layer were laminated on a transparent film substrate (however, the transparent laminate of Comparative Example 2 does not have the second curable transparent resin layer) was adhered to a black PET material using a transparent adhesive tape (manufactured by 3M Company, trade name: OCA TAPE 8171CL). Thus, the entire substrate was light-shielded.

In a darkroom, light from a fluorescent lamp (light source) was caused to enter the prepared substrate through the curable transparent resin layer surface side, the reflected light was visually observed in an oblique direction, and in this way, the visibility of the transparent electrode pattern was evaluated.

<<Evaluation Criteria>>
A: The transparent electrode pattern is not visible at all.
B: The transparent electrode pattern is slightly seen, but is almost invisible.
C: The transparent electrode pattern is visible (not recognizable).
D: The transparent electrode pattern is visible, but to a level tolerable for practical use.

E: The transparent electrode pattern is clearly visible (easily recognizable).

The results thus obtained are described in the following Table 2.

<Evaluation of Pencil Hardness>

The evaluation of pencil hardness described in JIS K 5400 was conducted as an indicator of scratch resistance. A sample film obtained by transferring the transfer film of each of the Examples and Comparative Examples onto a transparent film substrate, which was a PET film manufactured by Geomatec Co., Ltd., and forming the second curable transparent resin layer and the first curable transparent resin layer by a method similar to that of Example 1, was humidified for 1 hour at a temperature of 25° C. and a relative humidity of 60%. Subsequently, the evaluation was performed with n =7 under a load of 500 g, using a 2H test pencil as defined in JIS S 6006.

<<Evaluation Criteria>>

A: There are fewer than 3 scratches.
B: There are 3 or more and fewer than 5 scratches.
C: There are 5 or more and fewer than 6 scratches.
E: There are 6 or more scratches.

The results thus obtained are described in the following Table 2.

TABLE 2

| | Configuration of transparent laminate | | | | | | | | | | | Evaluation of transparent laminate | | |
|---|---|---|---|---|---|---|---|---|---|---|---|---|---|---|
| | | Transparent film | | Transparent electrode pattern | Second curable transparent resin layer | | | | First curable transparent resin layer | | | | Transparent electrode | |
| | Transparent substrate | Kind | Refractive index | | Kind | Refractive index | Content of metal oxide particles [mass %] | Film thickness (nm) | Kind | Refractive index | Film thickness (nm) | Double bond consumption rate | pattern visibility | Pencil hardness |
| Example 1 | Cycloolefin resin film | Material-3 | 1.6 | ITO | Material-3 | 1.6 | 28.1 | 80 | Material-1 | 1.51 | 2000 | A | C | A |
| Example 2 | Cycloolefin resin film | Material-3 | 1.6 | ITO | Material-4 | 1.63 | 37.9 | 90 | Material-1 | 1.51 | 2500 | A | C | A |
| Example 3 | Cycloolefin resin film | Material-3 | 1.6 | ITO | Material-5 | 1.65 | 43.9 | 100 | Material-2 | 1.52 | 1500 | A | B | A |
| Example 4 | Cycloolefin resin film | Material-3 | 1.6 | ITO | Material-6 | 1.69 | 57.0 | 70 | Material-1 | 1.51 | 3000 | A | B | A |
| Example 5 | Cycloolefin resin film | Material-3 | 1.6 | ITO | Material-7 | 1.7 | 59.9 | 65 | Material-2 | 1.52 | 2000 | A | A | A |
| Example 6 | Cycloolefin resin film | Material-3 | 1.6 | ITO | Material-8 | 1.72 | 65.8 | 52 | Material-1 | 1.51 | 1800 | A | A | A |
| Example 7 | Cycloolefin resin film | Material-3 | 1.6 | ITO | Material-9 | 1.74 | 72.4 | 100 | Material-1 | 1.51 | 2500 | A | A | A |
| Example 8 | Triacetyl cellulose (TAC) resin film | Material-3 | 1.6 | ITO | Material-8 | 1.72 | 65.8 | 150 | Material-11 | 1.53 | 2000 | A | B | A |
| Example 9 | Polyethylene terephthalate resin film | Material-3 | 1.6 | ITO | Material-8 | 1.72 | 65.8 | 500 | Material-1 | 1.51 | 2200 | A | B | A |

TABLE 2-continued

| | Configuration of transparent laminate | | | | | | | | | | | Evaluation of transparent laminate | | |
|---|---|---|---|---|---|---|---|---|---|---|---|---|---|---|
| | Transparent substrate | Transparent film | | Transparent electrode pattern | Second curable transparent resin layer | | | | First curable transparent resin layer | | | | Transparent electrode pattern visibility | Pencil hardness |
| | | Kind | Refractive index | | Kind | Refractive index | Content of metal oxide particles [mass %] | Film thickness (nm) | Kind | Refractive index | Film thickness (nm) | Double bond consumption rate | | |
| Example 10 | Cycloolefin resin film | Material-3 | 1.6 | ITO | Material-7 | 1.7 | 59.9 | 90 | Material-1 | 1.51 | 1000 | A | A | B |
| Example 11 | Cycloolefin resin film | Material-3 | 1.6 | ITO | Material-7 | 1.7 | 59.9 | 93 | Material-1 | 1.51 | 900 | A | A | C |
| Comparative Example 1 | Cycloolefin resin film | Material-3 | 1.6 | ITO | Material-10 | 1.59 | 25.1 | 83 | Material-1 | 1.51 | 2000 | A | E | A |
| Example 12 | Cycloolefin resin film | Material-3 | 1.6 | ITO | Material-7 | 1.7 | 59.9 | 550 | Material-1 | 1.51 | 2200 | A | D | B |
| Comparative Example 2 | Cycloolefin resin film | Material-3 | 1.6 | ITO | — | — | — | — | Material-1 | 1.51 | 2000 | A | E | A |
| Example 13 | Cycloolefin resin film | Material-3 | 1.6 | ITO | Material-8 | 1.72 | 65.8 | 52 | Material-2 | 1.52 | 1800 | B | D | A |
| Example 14 | Cycloolefin resin film | Material-3 | 1.6 | ITO | Material-5 | 1.65 | 43.9 | 100 | Material-2 | 1.52 | 5000 | A | B | A |
| Example 15 | Cycloolefin resin film | Material-3 | 1.6 | ITO | Material-6 | 1.69 | 57.0 | 70 | Material-1 | 1.51 | 5000 | A | B | A |
| Example 16 | Cycloolefin resin film (both surfaces) | HCl | 1.8 | IZO | Material-2 | 1.8 | 38.8 | 80 | Material-1 | 1.51 | 5000 | A | B | A |

From Table 2, it was found that the transparent laminate of the invention produced using the transfer film of the invention is free of the problem that the transparent electrode pattern is visually recognized.

On the other hand, in Comparative Example 1 in which a transfer film having a content of metal oxide particles below the scope of the invention was used because the second curable transparent resin layer contained metal oxide particles at a proportion of 25.1% by mass relative to the total solid content of the second curable transparent resin layer, the transparent electrode pattern of the transparent laminate thus obtained was clearly visible.

In Comparative Example 2 in which a transfer film that did not include a second curable transparent resin layer was used, the transparent electrode pattern of the transparent laminate thus obtained was clearly visible.

Furthermore, the content of metal oxide particles in the first curable transparent resin layer or the second curable transparent resin layer of the transparent laminate of each of the Examples and Comparative Examples was measured by the following method, and the values described in Table 2 were obtained.

A cross-section of the transparent laminate was cut, and the cross-section is observed by transmission electron microscope (TEM). The proportion of area occupied by metal oxide particles in the film cross-sectional area of the first curable transparent resin layer or the second transparent resin layer is measured at any arbitrary three sites within the layer, and the average value thereof is considered as the volume fraction (VR).

The volume fraction (VR) and the weight fraction (WR) are converted by the following formula, and thereby the weight fraction (WR) of metal oxide particles in the first curable transparent resin layer or the second curable transparent resin layer is calculated.

$$WR=1/(1.1*(1/(D*VR)-1)+1)$$

D: Specific gravity of metal oxide particles

In a case in which the metal oxide particles are titanium oxide particles, calculation can be made with D=4.0, and in the case of zirconium oxide, calculation can be made with D=6.0.

Meanwhile, the content of the metal oxide particles in the transparent film, the first curable transparent resin layer, and the second curable transparent resin layer of the transfer film or the transparent laminate of each of the Examples and Comparative Examples can also be calculated from the compositions of various materials given in Table 1 and Table 2.

<<Production of Image Display Device (Touch Panel)>>

A film including the transparent laminate of each of the Examples and Comparative Examples previously produced was bonded to a liquid crystal display element produced by the method described in paragraphs [0097] to [0119] of JP2009-47936A, and a front face glass plate was further adhered thereto. Thereby, an image display device including the transparent laminate of each of the Examples and Comparative Examples, the image display device including a capacitance-type input device as a constituent element, was produced by a known method.

<<Evaluation of Capacitance-type Input Device and Image Display Device>>

The capacitance-type input devices and image display devices that included the transparent laminates of various Examples were free of the problem that the transparent electrode pattern was visually recognized.

The first and second curable transparent resin layers also did not have defects such as air bubbles, and image display devices having excellent display characteristics were obtained.

EXPLANATION OF REFERENCES

1: transparent substrate (transparent film substrate or front face plate)
2: mask layer
3: transparent electrode pattern (first transparent electrode pattern)
3a: pad portion
3b: connection part
4: transparent electrode pattern (second transparent electrode pattern)
5: insulating layer
6: other conductive element
7: first curable transparent resin layer (preferably having a function as a transparent protective layer)
8: opening
10: capacitance-type input device
11: transparent film
12: second curable transparent resin layer (may have a function as a transparent insulating layer)
13: transparent laminate
21: region in which transparent electrode pattern, second curable transparent resin layer, and first curable transparent resin layer are laminated in this order
22: non-patterned region
α: taper angle
26: temporary support
29: protective release layer (protective film)
30: transfer film

What is claimed is:

1. A transparent laminate manufactured by a method for producing a transparent laminate, the method comprising laminating, on a transparent electrode pattern, the following second curable transparent resin layer and the following first curable transparent resin layer of a transfer film in this order,
wherein the transfer film comprises:
a temporary support;
a first curable transparent resin layer disposed adjacently to the temporary support to be in direct contact therewith; and
a second curable transparent resin layer disposed adjacently to the first curable transparent resin layer to be in direct contact therewith, in this order,
wherein the refractive index of the second curable transparent resin layer is higher than the refractive index of the first curable transparent resin layer,
the second curable transparent resin layer contains metal oxide particles at a proportion of 28.1% by mass to 95% by mass relative to the total solids content of the second curable transparent resin layer, and
the double bond consumption rate of the first curable transparent resin layer is 10% or higher,
wherein the transparent electrode pattern is a transparent electrode pattern formed on a transparent film substrate and the transparent laminate comprises the transparent electrode pattern, the second curable transparent resin layer, and the first curable transparent resin layer, respectively on both surfaces of the transparent film substrate.

2. A transparent laminate comprising:
a transparent electrode pattern;
a second curable transparent resin layer disposed adjacently to the transparent electrode pattern; and
a first curable transparent resin layer disposed adjacently to the second curable transparent resin layer,
wherein the refractive index of the second curable transparent resin layer is higher than the refractive index of the first curable transparent resin layer, and
the second curable transparent resin layer contains metal oxide particles at a proportion of 28.1% by mass to 95% by mass relative to the total solid content of the second curable transparent resin layer,
wherein the double bond consumption rate of the first curable transparent resin layer is 10% or higher; and
wherein the transparent electrode pattern is a transparent electrode pattern formed on a transparent film substrate and the transparent laminate comprises the transparent electrode pattern, the second curable transparent resin layer, and the first curable transparent resin layer, respectively on both surfaces of the transparent film substrate.

3. The transparent laminate according to claim 2, wherein the transparent laminate further comprises a transparent film containing a metal oxide and having a film thickness of 55 nm to 110 nm, or a transparent film having a refractive index of 1.6 to 1.80 and a film thickness of 55 nm to 110 nm, on the opposite side of the side of the transparent electrode pattern where the second curable transparent resin layer is formed.

4. The transparent laminate according to claim 3, wherein the transparent film is disposed between the transparent electrode pattern and the transparent film substrate.

5. A transparent laminate comprising:
a transparent electrode pattern;
a second curable transparent resin layer disposed adjacently to the transparent electrode pattern; and
a first curable transparent resin layer disposed adjacently to the second curable transparent resin layer,
wherein the first curable transparent resin layer contains metal oxide particles at a proportion of 0% by mass to 10% by mass relative to the total solid content of the first curable transparent resin layer, and
the second curable transparent resin layer contains metal oxide particles at a proportion of 28.1% by mass to 95% by mass relative to the total solid content of the second curable transparent resin layer,
wherein the double bond consumption rate of the first curable transparent resin layer is 10% or higher; and
wherein the transparent electrode pattern is a transparent electrode pattern formed on a transparent film substrate and the transparent laminate comprises the transparent electrode pattern, the second curable transparent resin layer, and the first curable transparent resin layer, respectively on both surfaces of the transparent film substrate.

* * * * *